(12) United States Patent
Tsukamoto et al.

(10) Patent No.: US 8,194,780 B2
(45) Date of Patent: Jun. 5, 2012

(54) DIFFERENTIAL SIGNAL OUTPUT DEVICE

(75) Inventors: Nobunari Tsukamoto, Kanagawa (JP); Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 968 days.

(21) Appl. No.: 12/222,523

(22) Filed: Aug. 11, 2008

(65) Prior Publication Data

US 2009/0046784 A1     Feb. 19, 2009

(30) Foreign Application Priority Data

Aug. 16, 2007   (JP) ................ 2007-212287

(51) Int. Cl.
*H04B 14/06* (2006.01)
(52) U.S. Cl. .................... 375/286; 375/296
(58) Field of Classification Search ............ 375/247, 375/232, 226, 286, 296, 295; 327/52, 112; 327/108; 326/22, 83

See application file for complete search history.

(56) References Cited

U.S. PATENT DOCUMENTS

| 2007/0047667 | A1* | 3/2007 | Shumarayev | 375/295 |
| 2007/0057702 | A1* | 3/2007 | Suenaga | 327/108 |
| 2007/0297548 | A1 | 12/2007 | Tsukamoto et al. | |
| 2008/0056420 | A1 | 3/2008 | Tsukamoto et al. | |
| 2008/0181330 | A1* | 7/2008 | Nakane | 375/296 |
| 2010/0321069 | A1* | 12/2010 | Komatsu et al. | 327/108 |

FOREIGN PATENT DOCUMENTS

| JP | 2002-525977 | 8/2002 |
| JP | 2006-060751 | 3/2006 |
| JP | 2006-109093 | 4/2006 |

* cited by examiner

*Primary Examiner* — Aristocratis Fotakis
(74) *Attorney, Agent, or Firm* — Dickstein Shapiro LLP

(57) ABSTRACT

A differential signal output device is disclosed that outputs transmission data as a differential signal. The device includes a first differential signal generation circuit that amplifies a signal representing the transmission data and generates the differential signal from the amplified signal; a dummy data generation circuit that is synchronized with a reference clock of the transmission data and generates dummy data that change only in a bit where the transmission data do not change; and a second differential signal generation circuit that amplifies a signal representing the dummy data and generates another differential signal from the amplified signal.

13 Claims, 24 Drawing Sheets

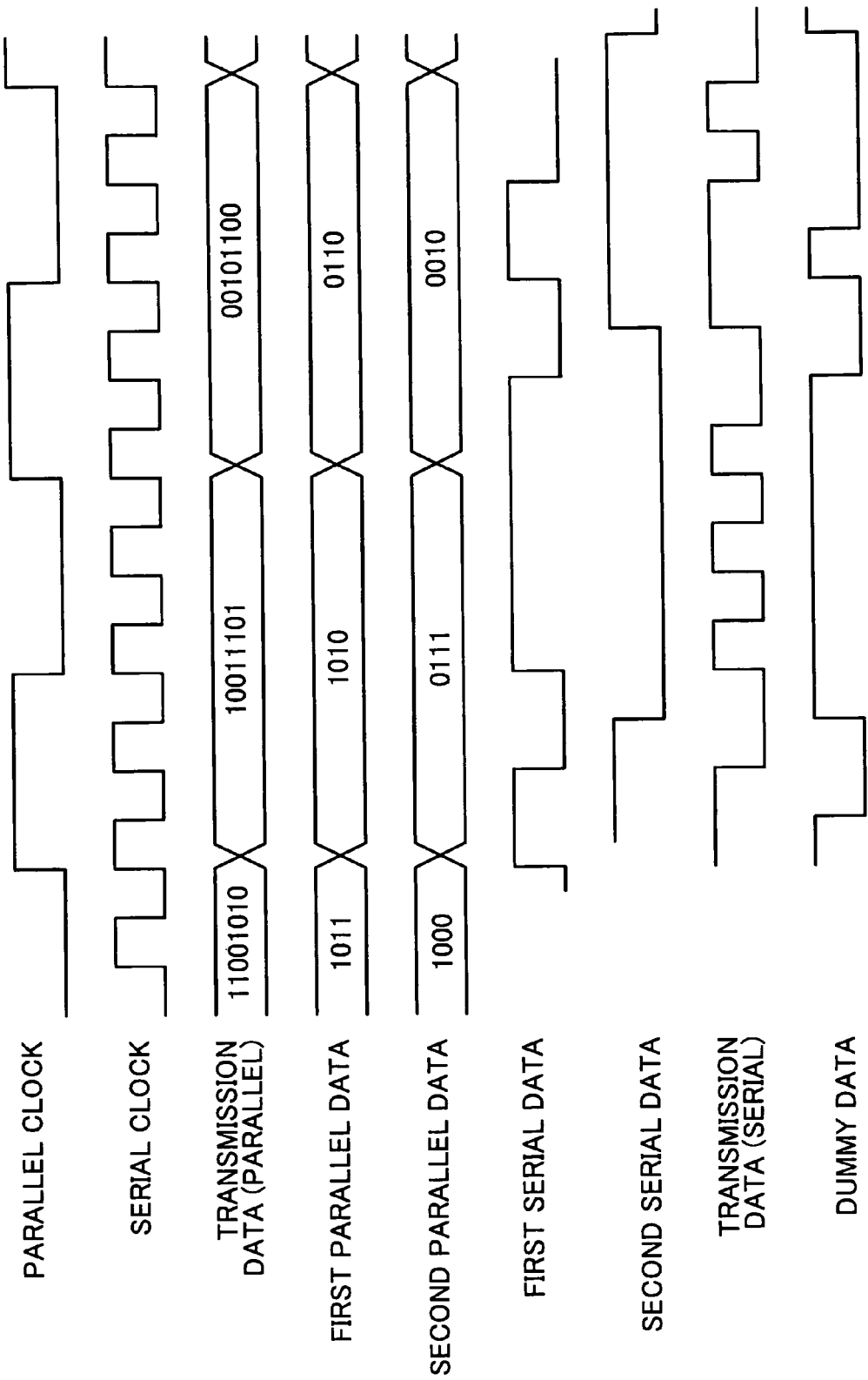

DIFFERENTIAL SIGNAL OUTPUT DEVICE

BACKGROUND OF THE INVENTION

1. Field of the Invention

The present invention relates generally to differential signal output devices that output transmission data as differential signals and, in particular, to a differential signal output device used for a transmitter, etc., that performs high-speed serial transmission as represented by Serial-ATA and PCI Express.

2. Description of the Related Art

In recent years and continuing to the present, so-called high-speed serial transmission is known as a technique employed in many transmission interface standards to meet requirements for large-volume and high-speed data transmission between equipment, boards, and chips. In the high-speed serial transmission, a transmission signal obtained by superposing a clock (embedded clock) on a signal representing transmission data is transmitted from the transmitting side, and then the clock is extracted from the signal received on the receiving side to restore the transmission data based on the extracted clock.

Jitter in high-speed serial transmission is roughly divided into two types, namely random jitter and deterministic jitter. The random jitter is caused by thermal noise due to transistors, etc., and random noise such as 1/f noise. The deterministic jitter is caused by deterministic factors such as interference between the codes of transmission data.

Preemphasis is known as a technique for reducing the deterministic jitter caused by the frequency characteristic of a transmission line. As shown in FIG. 1, preemphasis is a technique in which the amplitude caused when a transmission signal varies is previously emphasized on the transmitting side so that errors in transmission data to be demodulated from the transmission signal on the receiving side are suppressed.

An example using the preemphasis technique includes a method for generating a transmission signal having a desired waveform to which preemphasis is applied in such a manner that a signal having an appropriate phase difference is input to two drivers using a timer controlled to perform the proper preemphasis on a transmission line and the outputs of the two drivers are added to each other via a resistance (see, for example, Patent Document 1).

Furthermore, another example includes a method for reducing the timing jitter inherent in the preemphasis in such a manner that the respective internal nodes of a buffer that outputs a transmission signal having an ordinary amplitude and a buffer that outputs an emphasis signal obtained by emphasizing the amplitude of the transmission signal are connected to each other via a capacitor (see, for example, Patent Document 2).

Furthermore, still another example includes a method for reducing the jitter caused by the frequency characteristic of a transmission line in such a manner that the function of adjusting impedance is selects one bit of the transmission data and one bit of inversion data an output unit on the transmitting side and the output impedance of a circuit on the transmitting side is caused to interface with the characteristic impedance of a transmission line, and provided with the function of preemphasis regardless of variations in elements constituting the circuit on the transmitting side (see, for example, Patent Document 3).

Patent Document 1: JP-A-2002-525977
Patent Document 2: JP-A-2006-109093
Patent Document 3: JP-A-2006-60751

FIG. 2 shows a case using an equivalent circuit as a model when power is supplied to a semiconductor integrated circuit constituting a general purpose differential signal output device. In FIG. 2, the power supplied from a power supply circuit 23 to the semiconductor integrated circuit 26 is stabilized on a PCB (Printed Circuit Board) by a stabilization capacitor 24. In addition, it is stabilized by a stabilization capacitor 25 even in a chip including the semiconductor integrated circuit 26.

Furthermore, a parasitic impedance exists in a line for supplying the power, and an impedance via a bonding wire for mounting the chip on the PCB is also added. Note that in the equivalent circuit shown in FIG. 2 these impedances are denoted as the impedances 27a and 27b.

As the current supplied from the power supply circuit 23 varies, the power supply voltage of the semiconductor integrated circuit 26 is varied by the impedances 27a and 27b. Particularly, because the bonding wire has a large inductance component, the power supply in the chip may cause a ringing phenomenon responding to a rapid variation in the consumed current.

Moreover, recent high-speed serial transmissions have been made at wide band and have reached several GHz as a maximum frequency. Therefore, influence on the power supply voltage due to the variation in the consumed current due to a biased pattern of transmission data is not negligible.

FIG. 3 shows the configuration of the simplest output buffer used for a general purpose differential signal output device. When a "high level" signal is output from the output buffer shown in FIG. 3, an N-type MOS transistor 21 is turned off, while a P-type MOS transistor 22 is turned on. Therefore, the output voltage becomes equal to power supply voltage Vdd. On the other hand, when a "low level" signal is output from the output buffer, the N-type MOS transistor 21 is turned on, while the P-type MOS transistor 22 is turned off. Therefore, the output voltage becomes equal to ground voltage GND.

Here, when the power supply voltage varies, a potential difference between the power supply voltage Vdd and ground potential GND also varies. As a result, because the voltage at the rising edge or falling edge of the pulse of a transmission signal varies, pulse widths T1 and T2 of the transmission signal also vary. Such a variation in pulse width adversely affects the receiving side as jitter.

As described above, the methods described in Patent Documents 1 through 3 use a voltage difference between the power supply and ground as the reference for the amplitude of a transmission signal. Therefore, jitter caused by the variation in power supply voltage cannot be reduced.

SUMMARY OF THE INVENTION

The present invention has been made in order to solve the above conventional problem and may provide a differential signal output device capable of suppressing jitter in a transmission signal caused by a variation in power supply voltage.

According to an aspect of the present invention, a differential signal output device is provided that outputs transmission data as a differential signal. The device comprises a first differential signal generation circuit that amplifies a signal representing the transmission data and generates the differential signal from the amplified signal; a dummy data generation circuit that is synchronized with the reference clock of the transmission data and generates dummy data that change only in bits where the transmission data do not change; and a second differential signal generation circuit that amplifies a signal representing the dummy data and generates another differential signal from the amplified signal.

With this configuration, the differential signal output device according to an embodiment of the present invention causes the dummy data to change in the second differential signal generation circuit when the transmission data do not change in the first differential signal generation circuit. Accordingly, current consumed for causing data to change is made constant regardless of the biased pattern of the transmission data. As a result, the jitter in a transmission signal caused by a variation in power supply voltage can be suppressed.

Preferably, the first differential signal generation circuit may have plural switches for amplifying the signal representing the transmission data and generating the differential signal, and the second differential signal generation circuit may be composed of the same circuit as the first differential signal generation circuit.

With this configuration, the differential signal output device according to the embodiment of the present invention causes switching current to be fed to the second differential signal generation circuit when the switching current is not fed to the first differential signal output device. As a result, the current consumed for causing data to change can be made constant regardless of the biased pattern of the transmission data.

Preferably, the dummy data generation circuit alternately may select one bit of the transmission data and one bit of inversion data obtained by inverting the transmission data to generate the dummy data.

Preferably, the dummy data generation circuit may have a T flip-flop to which the reference clock is input and alternately selects one bit of the transmission data and one bit of the inversion data obtained by inverting the transmission data based on an output signal from the T flip-flop.

Preferably, the transmission data may be parallel data, the dummy data generation circuit may generate parallel dummy data that change only in bits where the parallel transmission data do not change between the bits of the parallel transmission data, and the differential signal output device may have a first serializer that serializes the parallel transmission data and a second serializer that serializes the parallel dummy data. In the differential signal output device, the first and the second differential signal generation circuits may respectively amplify signals representing the transmission data and the dummy data serialized by the first and the second serializers, and generate differential signals.

Preferably, the dummy data generation circuit may invert any one of adjacent two bits of the parallel transmission data to generate the parallel dummy data.

Preferably, the differential signal output device may further comprise a parallel data generation circuit that generates first parallel data and second parallel data to which one bit of the transmission data is alternately allocated; a first serializer that serializes the first parallel data to be first serial data; a second serializer that serializes the second parallel data to be second serial data; and a serial data generation circuit that is synchronized with the reference clock used for the first and the second serializers and alternately selects one bit of the first serial data and one bit of the second serial data to generate serial transmission data. In the differential signal output device, the dummy data generation circuit may be synchronized with the reference clock and alternately selects one bit of the first serial data and one bit of inversion data obtained by inverting the second serial data to generate the dummy data, and the first and the second differential signal generation circuits may respectively amplify signals representing the serial transmission data and the dummy data generated by the serial data generation circuit and the dummy data generation circuit, and generate differential signals.

With this configuration, the differential signal output device according to the embodiment of the present invention can output the transmission data at the rising edge and the falling edge of the reference clock. As a result, the differential signal can be output at the transmission rate two times the frequency of a serial clock.

Preferably, the first and the second differential signal generation circuits may each have a first series of plural adjustment switches that switch a connection between the output terminal of an inversion signal constituting the differential signal and a power supply; a second series of plural adjustment switches that switch a connection between the output terminal of the inversion signal and ground; a third series of plural adjustment switches that switch a connection between the output terminal of a noninversion output signal constituting the differential signal and the power supply; a fourth series of plural adjustment switches that switch a connection between the output terminal of the noninversion signal and ground; and at least one mode switch that switches the connections between the output terminals. In the differential signal device, the adjustment switches and the mode switch may switch the connections based on at least one of a mode signal for switching the amplitude of the differential signal and the signal representing the transmission data to change the amplitude of the differential signal.

With this configuration, the differential signal output device according to the embodiment of the present invention can change the amplitude of the differential signal with the switches. As a result, power consumption can be reduced.

Preferably, when the mode switch establishes the connections between the output terminals, the adjustment switches may switch the connections so that at least one of the first series of the adjustment switches, the mode switch, and at least one of the fourth series of the adjustment switches connect the power supply and ground in series or at least one of the third series of the adjustment switches, the mode switch, and at least one of the second series of the adjustment switches connect the power supply and ground in series based on the signal representing the transmission data.

With this configuration, the differential signal output device according to the embodiment of the present invention increases a series resistance value between the power supply and ground when the mode switch establishes the connections between the output terminals. This reduces the current consumed by the differential signal output device. As a result, power consumption can be reduced.

Preferably, the adjustment switches and mode switch may set an impedance to prevent the output impedance of the differential signal output device from being varied regardless of the statuses of the mode signal.

Preferably, the adjustment switches and the mode switch may have a MOS transistor and a resistor connected in series to the MOS transistor.

Preferably, the resistor may be composed of a variable resistor, and the adjustment switch may have an impedance adjustment circuit that adjusts the resistance value of the variable resistor to adjust the impedance of the adjustment switch.

With this configuration, the differential signal output device according to the embodiment of the present invention prevents the on-resistance value of the adjustment switch from being varied in accordance with temperature, power supply voltage, etc., causing the variation in the output impedance.

Preferably, the differential signal output device may be composed of a semiconductor integrated circuit.

According to the embodiment of the present invention, a differential signal output device capable of suppressing the jitters in a transmission signal caused by a variation in power supply voltage can be provided.

Other objects, features and advantages of the present invention will become more apparent from the following detailed description when read in conjunction with the accompanying drawings.

BRIEF DESCRIPTION OF THE DRAWINGS

FIG. 26 is a timing chart of the differential signal output device according to the third embodiment of the present invention.

DETAILED DESCRIPTION OF THE PREFERRED EMBODIMENTS (First Embodiment)

Figure 5:
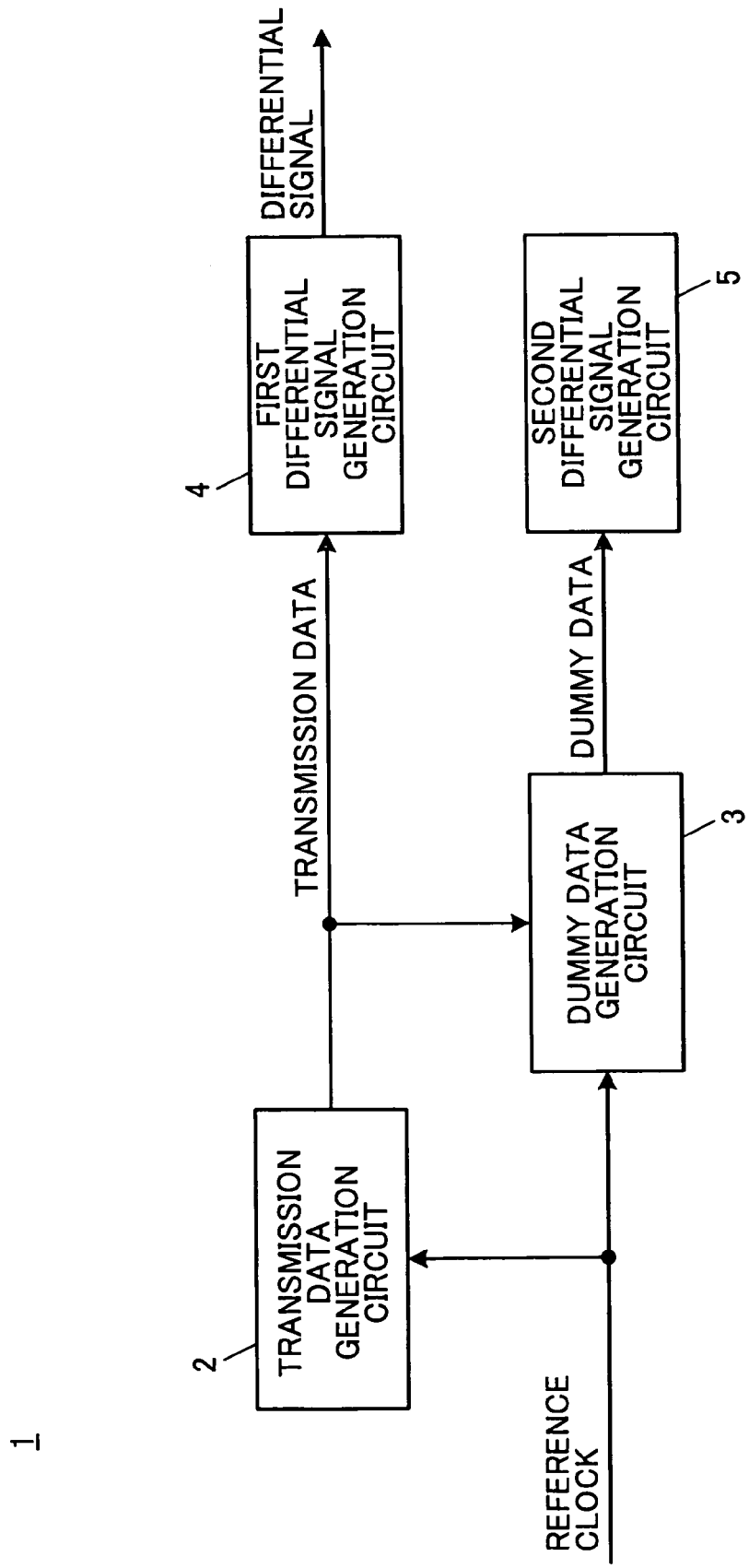
FIG. 5 is a block diagram of a differential signal output device according to a first embodiment of the present invention.

A differential signal output device according to a first embodiment of the present invention is shown in FIG. 5.

As shown in FIG. 5, a differential signal output device 1 has a transmission data generation circuit 2 that generates serial transmission data; a dummy data generation circuit 3 that generates serial dummy data that are synchronized with the reference clock of transmission data and change only in bits where the transmission data do not change; a first differential signal generation circuit 4 that amplifies a signal representing the transmission data and generates a differential signal from the amplified signal; and a second differential signal generation circuit 5 that amplifies a signal representing the dummy data and generates a differential signal from the amplified signal.

The transmission data generation circuit 2 is composed of a logic circuit, etc., of an image processing apparatus, a data link layer, or the like and outputs the serial transmission data to the dummy data generation circuit 3 and the first differential signal generation circuit 4. Note that the transmission data generation circuit 2 may be composed of a serializer that serializes input parallel transmission data.

Figure 6:
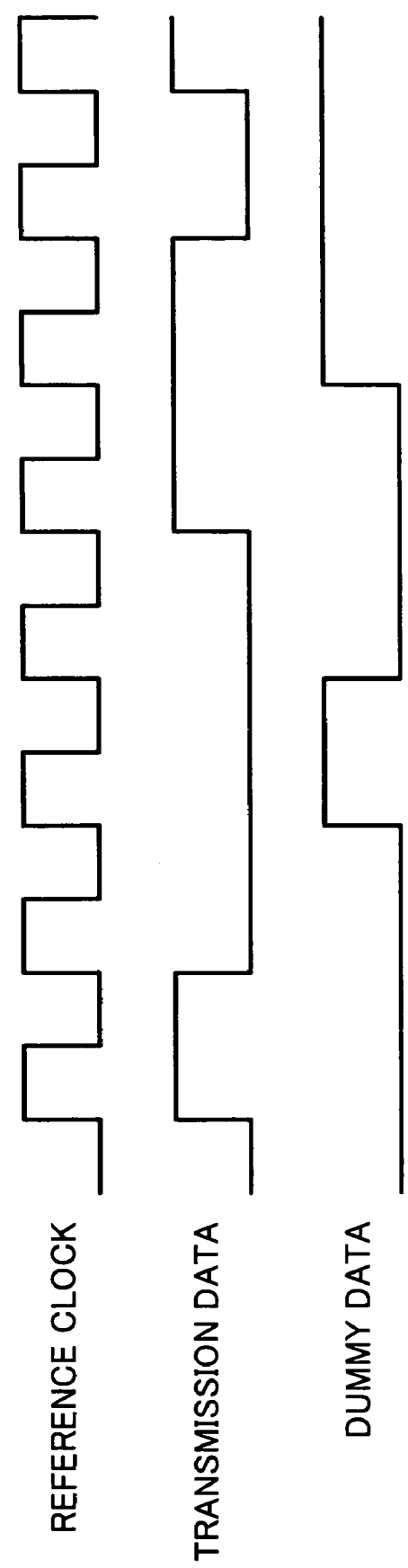
FIG. 6 is a timing chart of the differential signal output device according to the first embodiment of the present invention.

The dummy data generation circuit 3 generates the dummy data based on the serial transmission data generated by the transmission data generation circuit 2. Specifically, as shown in FIG. 6, the dummy data generation circuit 3 generates the dummy data that change when the transmission data do not change between bits. Accordingly, any one of the transmission data and the dummy data change at all the rising edges of the reference clock.

Here, assume that the transmission data output from the transmission data generation circuit 2 at the rising edge of the n-th reference clock counted from time 0 are S(n) and the dummy data output from the dummy data generation circuit 3 at the rising edge of the n-th reference clock are D(n). In addition, assume that D(0)=S(0).

Assume that D(k)=S(k) where n=k. When the transmission data have not changed where n=k+1, namely, when the relationship S(k+1)=S(k) is established, the dummy data change. Therefore, D(k+1) can be represented as follows.

$$D(k+1)=\text{not}(D(k))=\text{not}(S(k))=\text{not}(S(k+1))$$

On the other hand, when the transmission data have changed where n=k+1, namely, when the relationship S(k+1)=not(S(k)) is established, the dummy data do not change. Therefore, D(k+1) can be represented as follows.

$$D(k+1)=D(k)=S(k)=\text{not}(S(k+1))$$

Accordingly, the relationship D(k+1)=not(S(k+1)) is established regardless of whether the transmission data have changed where n=k+1.

Furthermore, when the transmission data have not changed since n=k+1 where n=k+2, namely, when the relationship S(k+2)=S(k+1) is established, the dummy data change. Therefore, D(k+2) can be represented as follows.

$$D(k+2)=\text{not}(D(k+1))=S(k+1)=S(k+2)$$

On the other hand, when the transmission data have changed since n=k+1 where n=k+2, namely, when the relationship S(k+2)=not(S(k+1)) is established, the dummy data do not change. Therefore, D(k+2) can be represented as follows.

$$D(k+2)=D(k+1)=\text{not}(S(k+1))=S(k+2)$$

Accordingly, the relationship D(k+2)=S(k+2) is established regardless of whether the transmission data have changed since n=k+1 where n=k+2.

As described above, where D(0)=S(0), the following relationships are established.

$$D(n) = \text{not}(S(n)) \quad n\text{: odd number}$$
$$= S(n) \quad n\text{: even number}$$

Similarly, where D(0)=not(S(0)), the following relationships are established.

$$D(n) = \text{not}(S(n)) \quad n\text{: odd number}$$
$$= S(n) \quad n\text{: even number}$$

That is, D(n) can be generated by normally and inversely rotating S(n) for each clock cycle.

Figure 7:
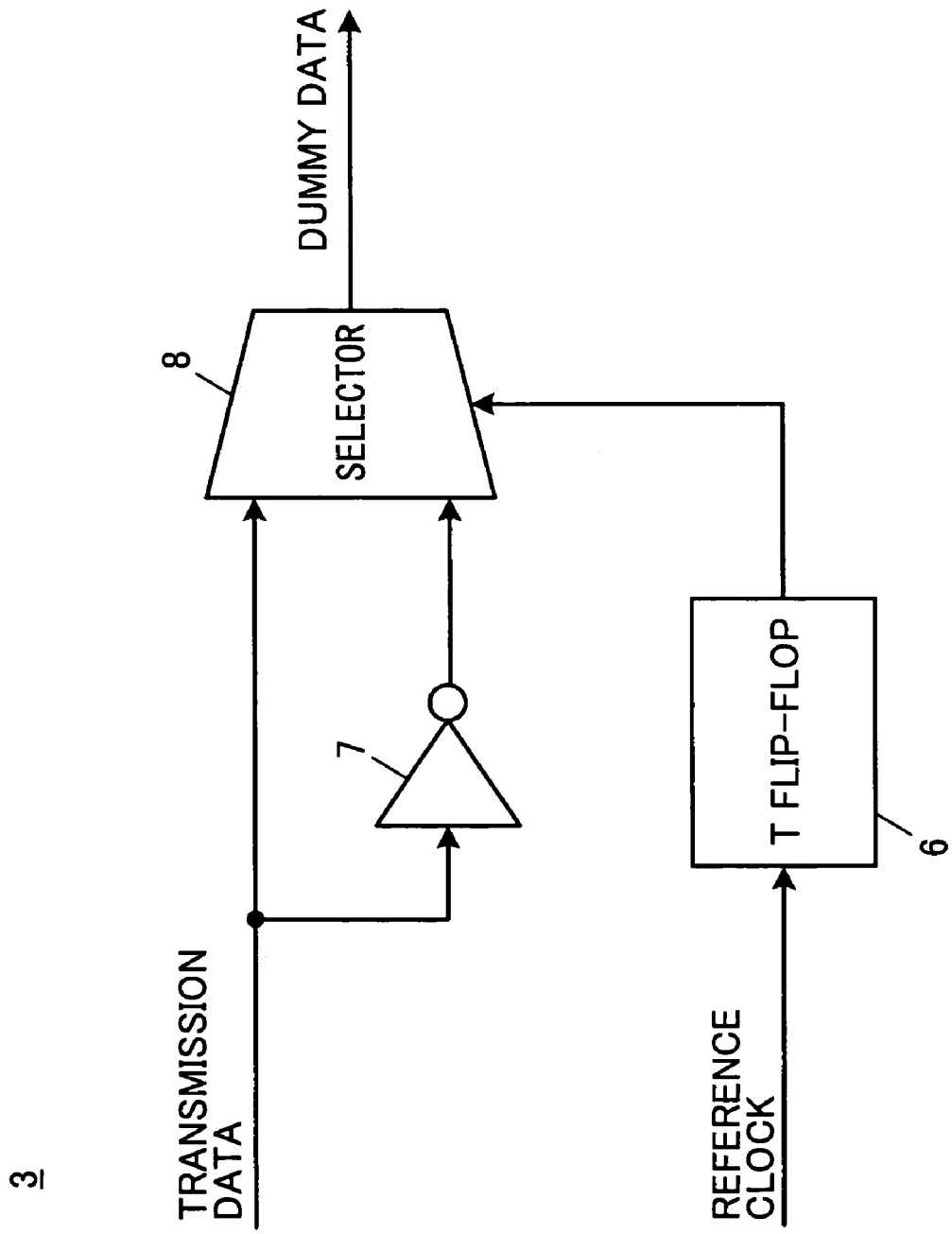
FIG. 7 is a block diagram of a dummy data generation circuit constituting the differential signal output device according to the first embodiment of the present invention.

FIG. 7 shows a configuration example of the dummy data generation circuit 3 that generates the dummy data in the above manner. In FIG. 7, the dummy data generation circuit 3 is composed of a T flip-flop 6 that alternately outputs a "high level" signal and a "low level" signal in synchronization with the rising edge of the reference clock; an inverter 7 that inverts the serial transmission data; and a selector 8 that selects any one of the serial transmission data and the transmission data obtained by inverting the inverter 7 in response to the output from the T flip-flop 6.

Figure 8:
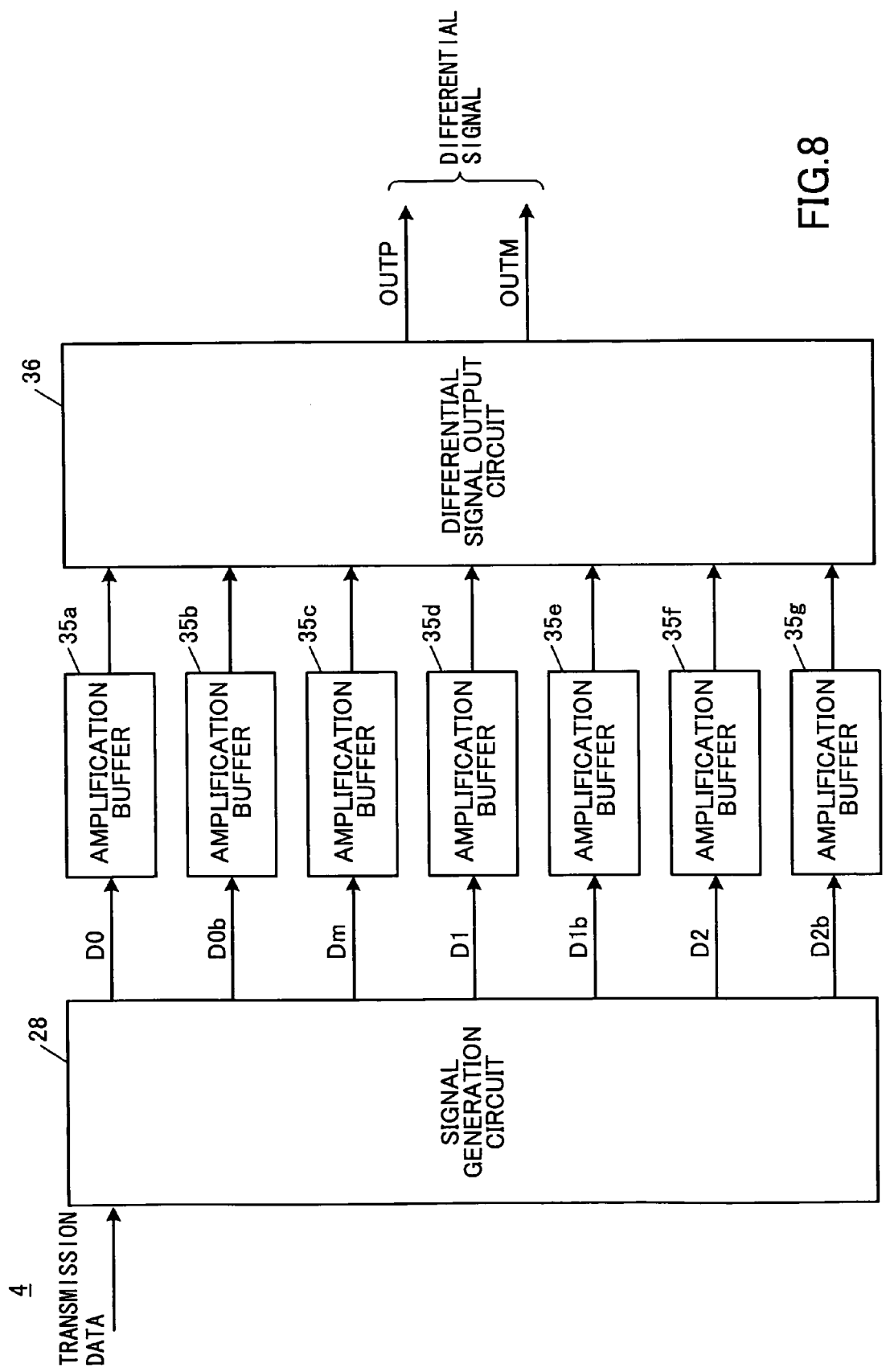
FIG. 8 is a block diagram of a first differential signal generation circuit constituting the differential signal output device according to the first embodiment of the present invention.

As shown in FIG. 8, the first differential signal generation circuit 4 has a signal generation circuit 28 that generates plural signals for generating the differential signal representing the transmission data, plural amplification buffers 35a through 35g that amplify these signals, and a differential signal output circuit 36. The differential signal output circuit 36 outputs an inversion output signal OUTP and a noninversion output signal OUTM constituting the differential signal.

The signal generation circuit 28 generates a data signal D0 representing the transmission data, an inversion signal D0b obtained by inverting the data signal D0, a mode signal Dm representing whether the amplitude of a transmission signal is emphasized, a signal D1 consisting of the logical sum of the data signal D0 and the mode signal Dm, an inversion signal D1b obtained by inverting the signal D1, a signal D2 consisting of the logical sum of the inversion signal D0b and the mode signal Dm, and an inversion signal D2b obtained by inverting the signal D2.

Note that in this embodiment the first differential signal generation circuit 4 has the preemphasis function, and the signal generation circuit 28 sets the mode signal Dm to be at "low level" when emphasizing the amplitude of the transmission signal, i.e., when the transmission data changes, and sets the mode signal Dm to be at "high level" when not emphasizing the amplitude of the transmission signal, i.e., when the data signal does not change.

Figure 9:
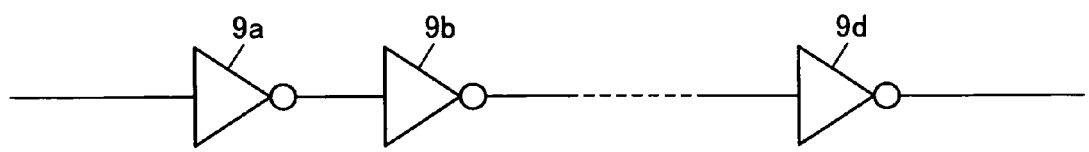
FIG. 9 is a block diagram of an amplification buffer constituting the first differential signal generation circuit shown in FIG. 8.

As shown in FIG. 9, each of the amplification buffers 35a through 35g (hereinafter referred to as an "amplification buffer 35") is composed of plural CMOS (Complementary Metal Oxide Semiconductor) inverters 9a through 9d. The size of the CMOS inverters 9a through 9d (the channel width of transistors) increases from the input side to the output side.

Because the driving performance of CMOS inverters is generally proportional to their sizes, the amplification buffer 35 outputs a signal after amplifying the same to a sufficient driving performance. Therefore, the number of the CMOS inverters constituting the amplification buffer 35 is not limited, and the amplification buffer 35 may be composed of the required number of the CMOS inverters.

Figure 10:
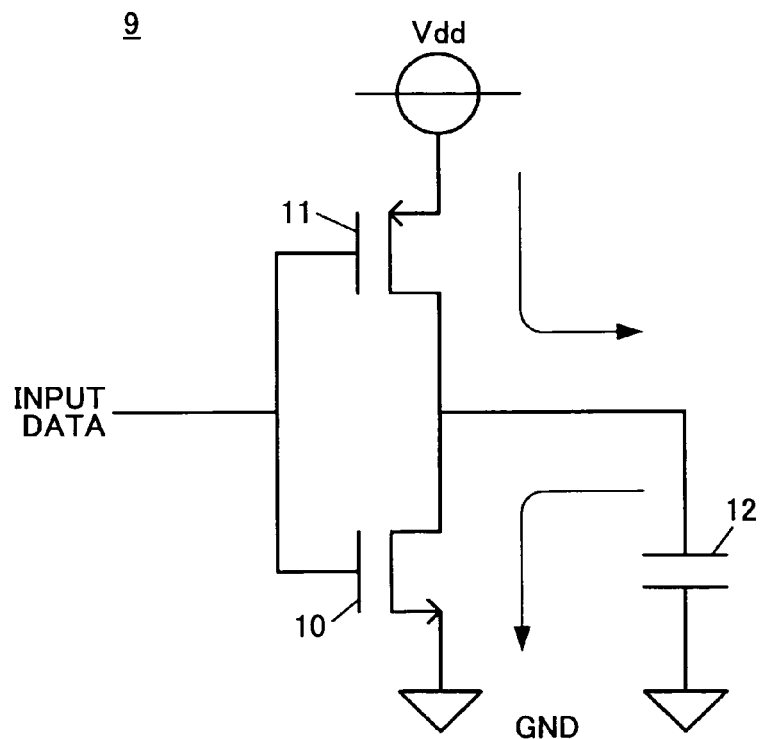
FIG. 10 is a block diagram of a CMOS inverter constituting the amplification buffer shown in FIG. 9.

As shown in FIG. 10, each of the CMOS inverters 9a through 9d (hereinafter referred to as a "CMOS inverter 9") is composed of an N-type MOS transistor 10 and a P-type MOS transistor 11. Note that in FIG. 10 a load capacitor 12 represents the input load or the parasitic capacity of wiring in the following stage CMOS inverter.

Figure 11:
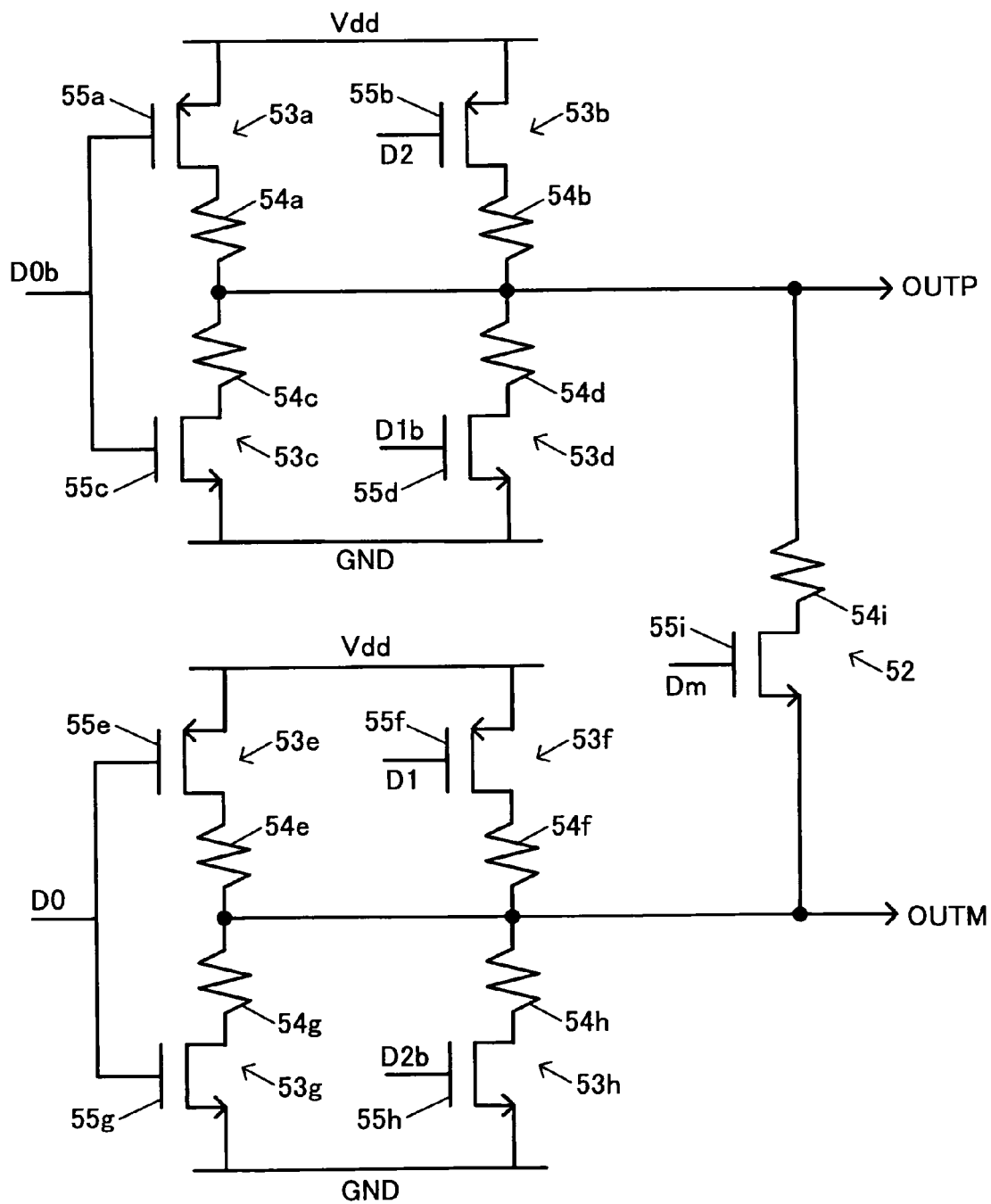
FIG. 11 is a block diagram of a differential signal output circuit constituting the first differential signal generation circuit shown in FIG. 8.

As shown in FIG. 11, the differential signal output circuit 36 has a first series of adjustment switches 53a and 53b arranged in parallel between the output terminal of the inversion output signal OUTP and a power supply; a second series of adjustment switches 53c and 53d arranged in parallel between the output terminal of the inversion output signal OUTP and ground; a third series of adjustment switches 53e and 53f arranged in parallel between the output terminal of the noninversion output signal OUTM and the power supply; a fourth series of adjustment switches 53g and 53h arranged in parallel between the output terminal of the noninversion output signal OUTM and ground; and a mode switch 52 that switches a connection between the output terminal of the inversion output signal OUTP and the output terminal of the noninversion output signal OUTM.

The adjustment switch 53a has a resistor 54a having one end connected to the output terminal of the inversion output signal OUTP and a P-type MOS transistor 55a having a drain connected to the power supply, a source connected to the other end of the resistor 54a, and a gate to which the inversion signal D0b is input.

The adjustment switch 53b has a resistor 54b having one end connected to the output terminal of the inversion output signal OUTP and a P-type MOS transistor 55a having a drain connected to the power supply, a source connected to the other end of the resistor 54a, and a gate to which the signal D2 is input.

The adjustment switch 53c has a resistor 54c having one end connected to the output terminal of the inversion output signal OUTP and an N-type MOS transistor 55c having a drain connected to ground, a source connected to the other end of the resistor 54c, and a gate to which the inversion signal D0b is input.

The adjustment switch 53d has a resistor 54d having one end connected to the output terminal of the inversion output signal OUTP and an N-type MOS transistor 55d having a drain connected to ground, a source connected to the other end of the resistor 54d, and a gate to which the signal D1b is input.

The adjustment switch 53e has a resistor 54e having one end connected to the output terminal of the noninversion output signal OUTM and a P-type MOS transistor 55e having a drain connected to the power supply, a source connected to the other end of the resistor 54e, and a gate to which the data signal D0 is input.

The adjustment switch 53f has a resistor 54f having one end connected to the output terminal of the noninversion output signal OUTM and a P-type MOS transistor 55f having a drain connected to the power supply, a source connected to the other end of the resistor 54f, and a gate to which the signal D1 is input.

The adjustment switch 53g has a resistor 54g having one end connected to the output terminal of the noninversion output signal OUTM and an N-type MOS transistor 55g having a drain connected to ground, a source connected to the other end of the resistor 54g, and a gate to which the data signal D0 is input.

The adjustment switch 53h has a resistor 54h having one end connected to the output terminal of the noninversion output signal OUTM and an N-type MOS transistor 55h having a drain connected to ground, a source connected to the other end of the resistor 54h, and a gate to which the signal D2b is input.

The mode switch 52 has a resistor 54i having one end connected to the output terminal of the inversion output signal OUTP and an N-type MOS transistor 55i having a drain connected to the other end of the resistor 54i, a source connected to the output terminal of the noninversion output signal OUTM, and a gate to which the mode signal Dm is input.

In the following description, assume that the on-resistances of the MOS transistors 55a through 55i are zero and their off-resistances are infinity in order to facilitate the understanding of the present invention. Furthermore, assume that each resistance value of the resistors 54a through 54d is R1, each resistance value of the resistors 54e through 54h is R2, and the resistance value of the resistor 54i is Rm.

Here, when the mode signal Dm is at "low level," the relationships D1=D2b=D0 and D1b=D2=D0b are established. Accordingly, when the data signal D0 is at "high level," all the MOS transistors 55a, 55b, 55g, and 55h are turned on while all the MOS transistors 55c, 55d, 55e, and 55f are turned off.

Furthermore, the MOS transistor 55i is also turned off. Therefore, the inversion output signal OUTP is at "high level" due to the current fed from the resistors 54a and 54b, while the noninversion output signal OUTM is at "low level" due to the current fed to the resistors 54g and 54h.

The same applies to a case when the data signal D0 is at "low level." The inversion output signal OUTP and the non-inversion output signal OUTM are at "low level" and "high level," respectively. Accordingly, when the mode signal Dm is at "low level," an output impedance Rout0 is determined based on a parallel resistance between the resistors 54a and 54b (or a parallel resistance between the resistors 54g and 54h). Therefore, it is represented as follows.

$$Rout0=(R1\times R2)/(R1+R2)$$

On the other hand, when the mode signal Dm is at "high level," the signals D1 and D2 are at "high level" at all times while the signals D1b and D2b are at "low level" at all times. Accordingly, the MOS transistors 55a and 55g are turned on, while the MOS transistors 55b through 55f and 55h are all turned off. Furthermore, the MOS transistor 55i is turned on.

For example, when the data signal D0 is at "high level," the inversion signal D0b is at "low level." Therefore, the current passes from the resistor 54a to the resistor 54g via the resistor 54i, and the inversion output signal OUTP and the noninversion output signal OUTM are output at respective levels divided by the resistors 54a, 54i, and 54g. Accordingly, because the inversion output signal OUTP and the noninversion output signal OUTM constitute the differential signal, an output impedance Rout1 when the mode signal Dm is at "high level" is as follows.

$$Rout1=(R1\times(Rm/2))/(R1+(Rm/2))$$

Figure 12:
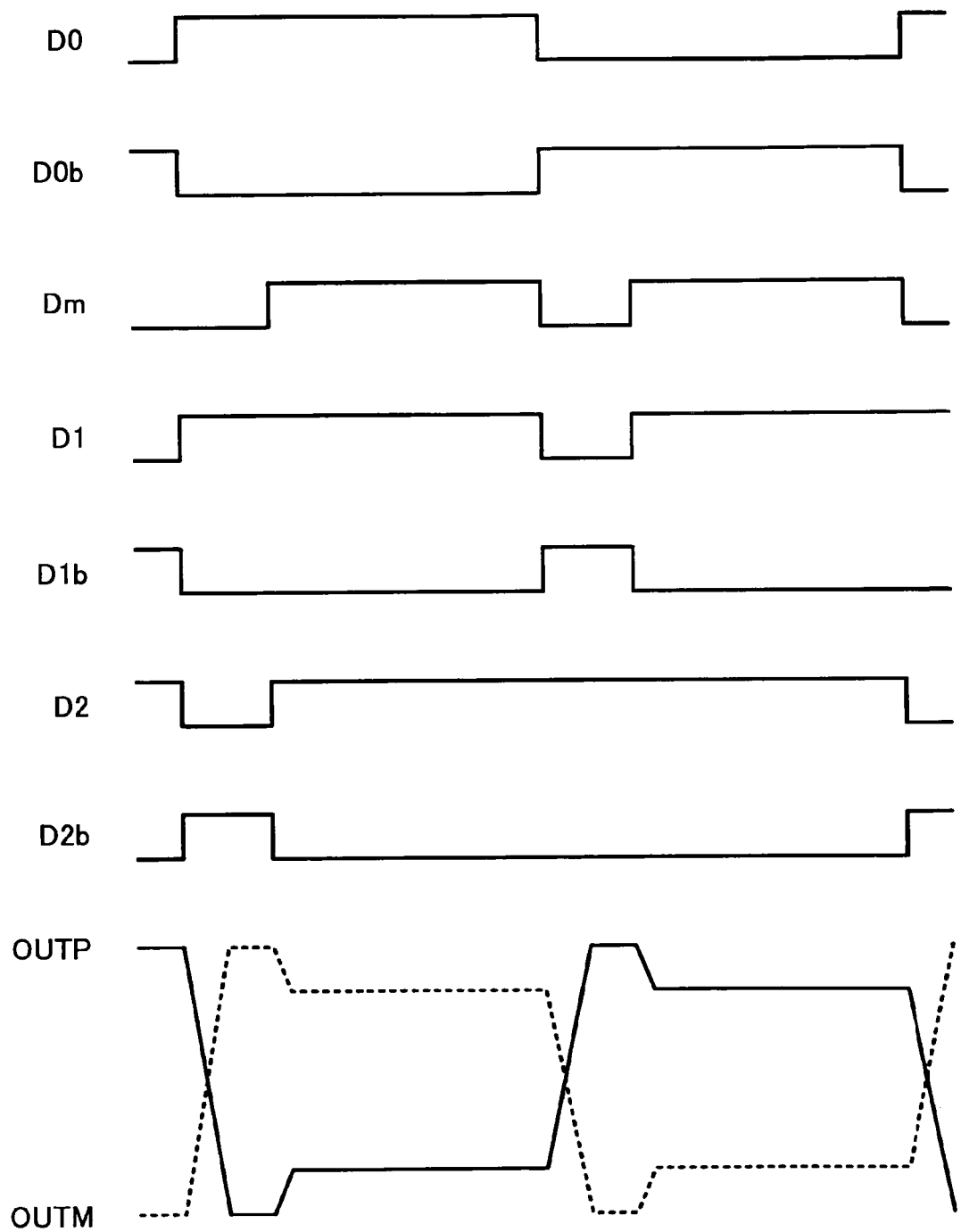
FIG. 12 is a timing chart of the differential signal output circuit shown in FIG. 11.

Here, FIG. 12 shows a relationship between the signals D0, D0b, D1, D1b, D2, D2b, and Dm and the output signals OUTP and OUTM. As shown in FIG. 12, the positives and negatives of the output signals OUTP and OUTM are determined by the data signal D0, while the the amplitudes of the output signals OUTP and OUTM are determined by the mode signal Dm.

Generally, in high-speed serial transmission, an impedance-matched circuit is frequently used to perform differential transmission so as to ensure signal quality. An example of a circuit on the receiving side in this case is shown in FIG. 13.

Figure 13:
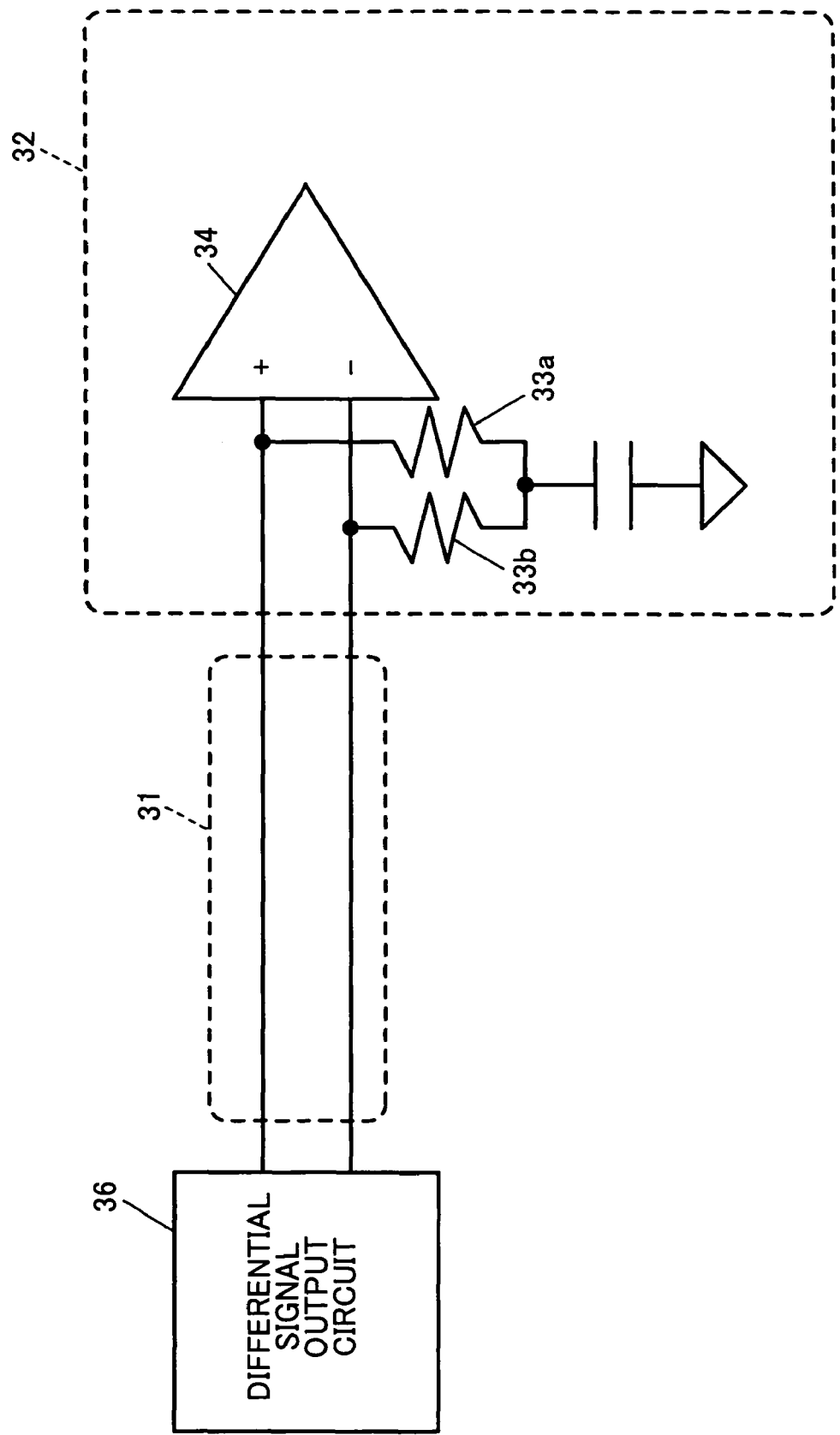
FIG. 13 is a block diagram of the differential signal output circuit shown in FIG. 11 and a receiver.

In FIG. 13, a receiver 32 has resistors 33a and 33b having a resistance value of R0 so as to match the characteristic impedance of a transmission line 31. Accordingly, the transmission line 31 is terminated by an input impedance R0, and the receiver 32 receives a transmission signal with a differential amplifier 34.

On the other hand, the output impedance of the differential signal output circuit 36 shown in FIG. 11 becomes Rout0 when the mode signal Dm is at "high level" and becomes Rout1 when the mode signal Dm is at "low level."

Therefore, the output impedance of the differential signal output circuit 36 can be matched to the input impedance R0 by selection of R1, R2, and Rm so that the relationship Rout0=Rout1=R0 is established. Accordingly, the relationship Rm=2×R2 is derived from the relationship Rout0=Rout1.

Figure 14B:
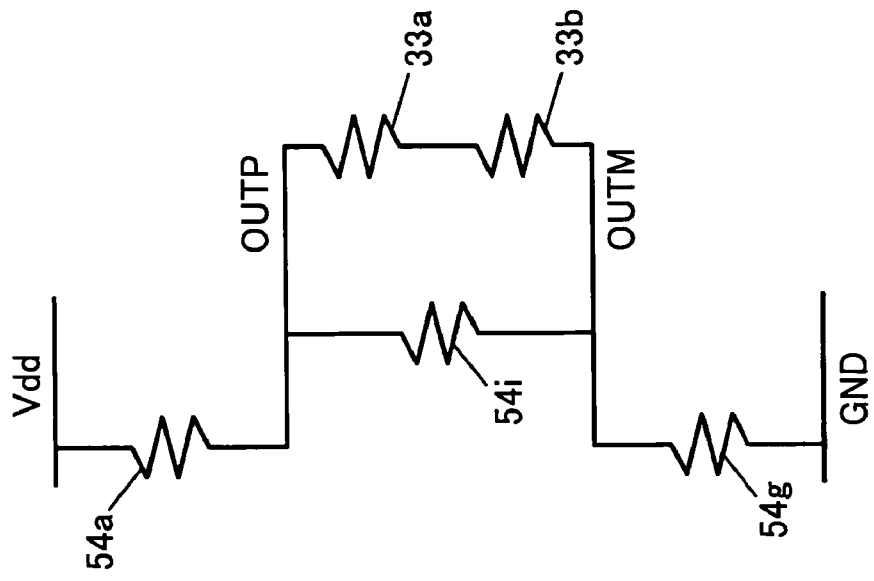
FIG. 14B is a block diagram of an equivalent circuit also including the receiving side of the differential signal output circuit shown in FIG. 11.
Figure 14A:
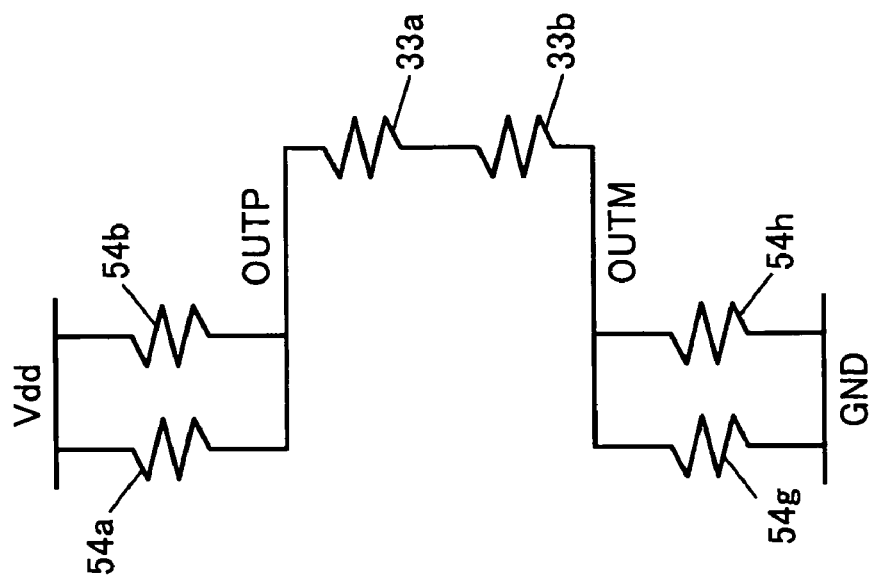
FIG. 14A is a block diagram of an equivalent circuit also including the receiving side of the differential signal output circuit shown in FIG. 11.

FIG. 14A shows an equivalent circuit also including the receiving side when the data signal D0 is at "high level" and the mode signal Dm is at "low level." In this case, the levels of the output signals OUTP and OUTM are as follows.

$$OUTP=(\tfrac{3}{4})\times Vdd$$

$$OUTM=(\tfrac{1}{4})\times Vdd$$

Furthermore, FIG. 14B shows an equivalent circuit also including the receiving side when the data signal D0 is at "high level" and the mode signal Dm is at "high level." In this case, the levels of the output signals OUTP and OUTM are as follows.

$$OUTP=(\tfrac{1}{4})\times(3-R1/(R1+R2))\times Vdd$$

$$OUTM=(\tfrac{1}{4})\times(1+R1/(R1+R2))\times Vdd$$

Accordingly, the ratio of the amplitudes of the output signals OUTP and OUTM when the mode signal Dm is at "low level" to the amplitudes of the output signals OUTP and OUTM when the mode signal Dm is at "high level" can be desirably set by a proper selection of the values of R1 and R2. Furthermore, because the resistance value seen in series from the power supply to the ground increases when the amplitudes are suppressed (when the mode signal Dm is at "high level"), a current amount is reduced.

In FIG. 5, the second differential signal generation circuit 5 is configured in the same manner as the first differential signal generation circuit 4. Therefore, a detailed description of the second differential signal generation circuit 5 is omitted. Note that the inversion output signal and the noninversion output signal generated by the second differential signal generation circuit 5 are not required to be output from the differential signal output device 1.

The CMOS inverter shown in FIG. 10 hardly allows current to pass through unless input data change, making its power consumption greatly reduced. On the other hand, when the input data change, the CMOS inverter feeds switching current for discharge and charge to the input capacitor of the next stage CMOS inverter.

For example, when the input data change from "high level" to "low level," the MOS transistor 10 is turned off while the MOS transistor 11 is turned on. In this case, the load capacitor 12 is charged, and the switching current is fed via the MOS transistor 11 until output voltage becomes equal to the power supply voltage Vdd.

Conversely, when the input data change from "low level" to "high level," the MOS transistor 11 is turned off while the MOS transistor 10 is turned on. In this case, the switching current is fed via the MOS transistor 10 by the charge accumulated in the load capacitor 12.

Figure 1:
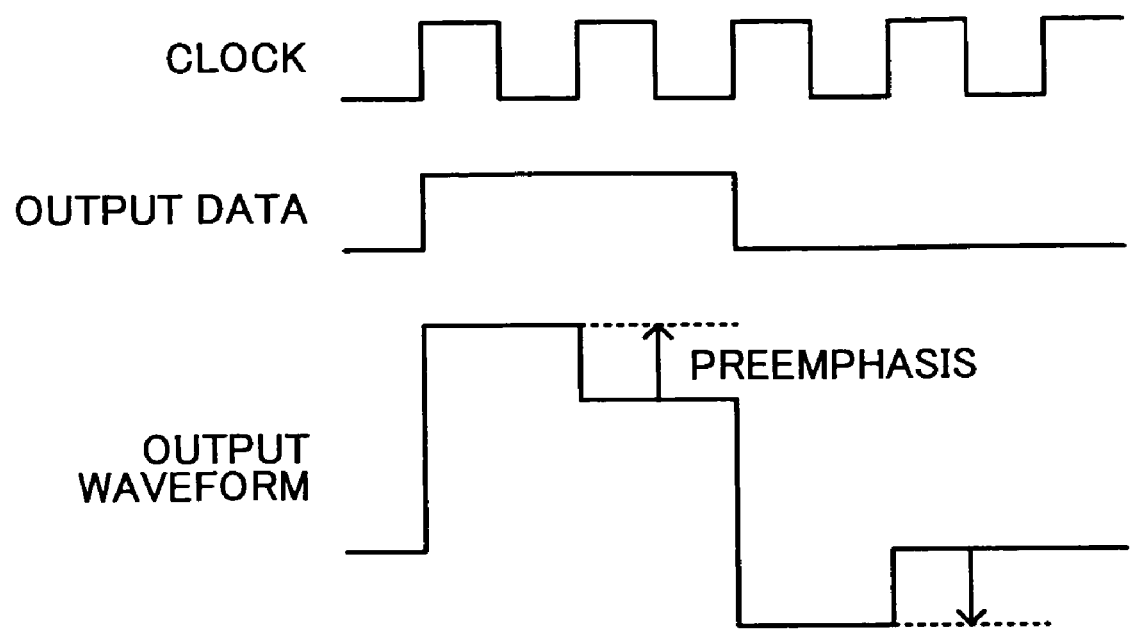
FIG. 1 is a conceptual diagram showing an output waveform obtained by preemphasis.
Figure 2:
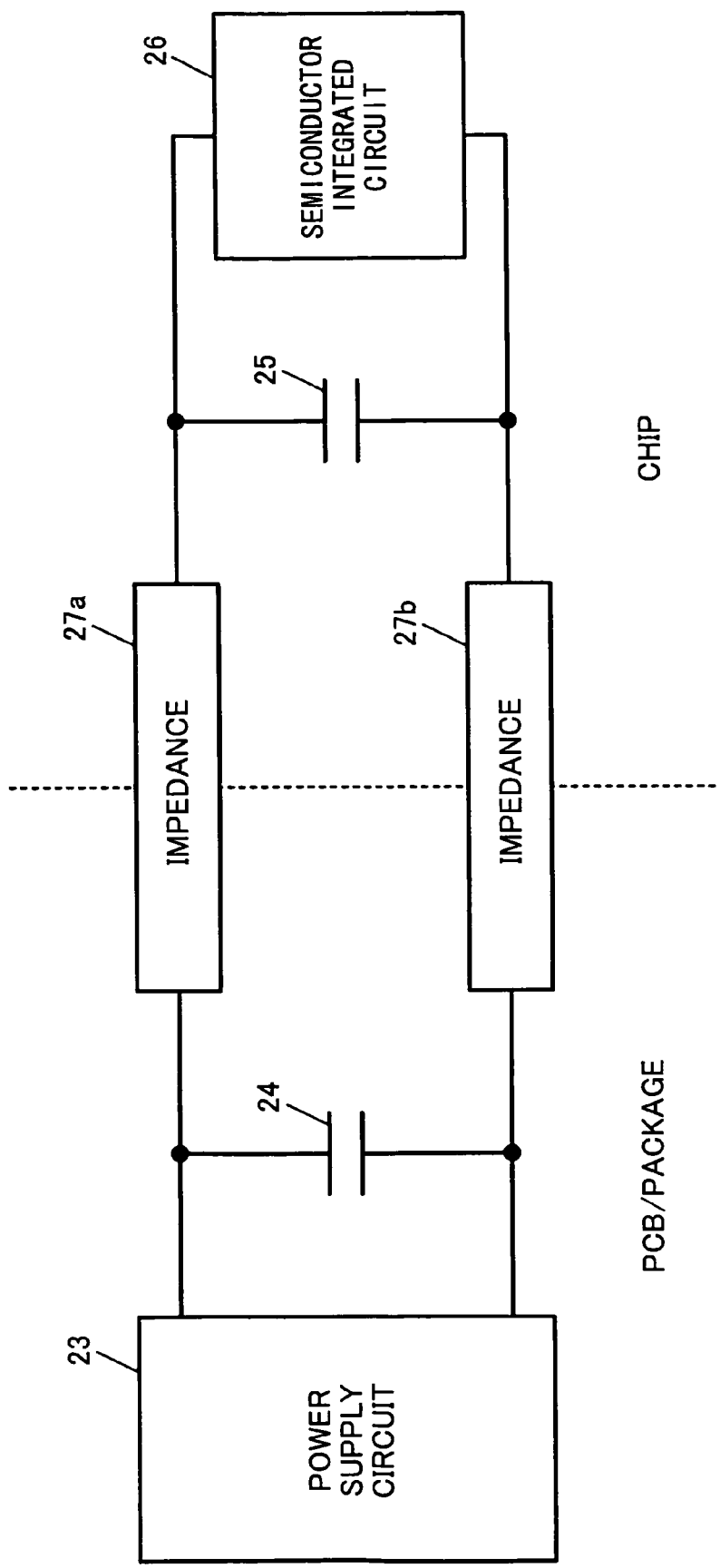
FIG. 2 is a block diagram of an equivalent circuit as a model when power is supplied to a semiconductor integrated circuit constituting a general purpose differential signal output device.
Figure 3:
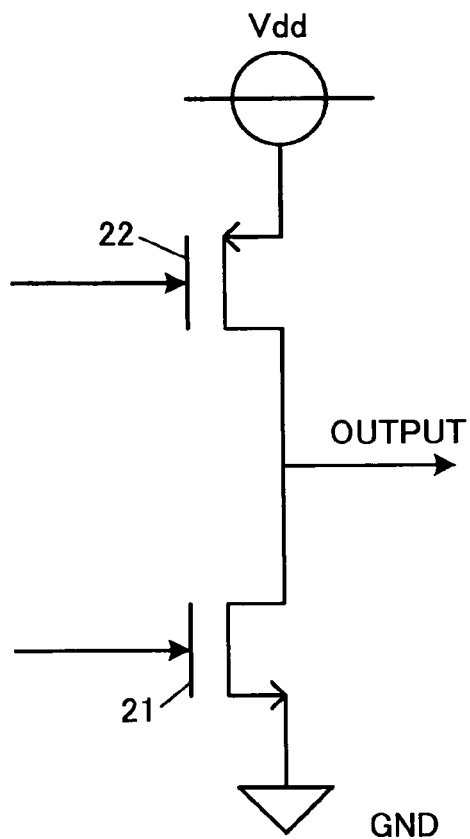
FIG. 3 is a block diagram of the simplest output buffer used for a general purpose differential signal output device.
Figure 15:
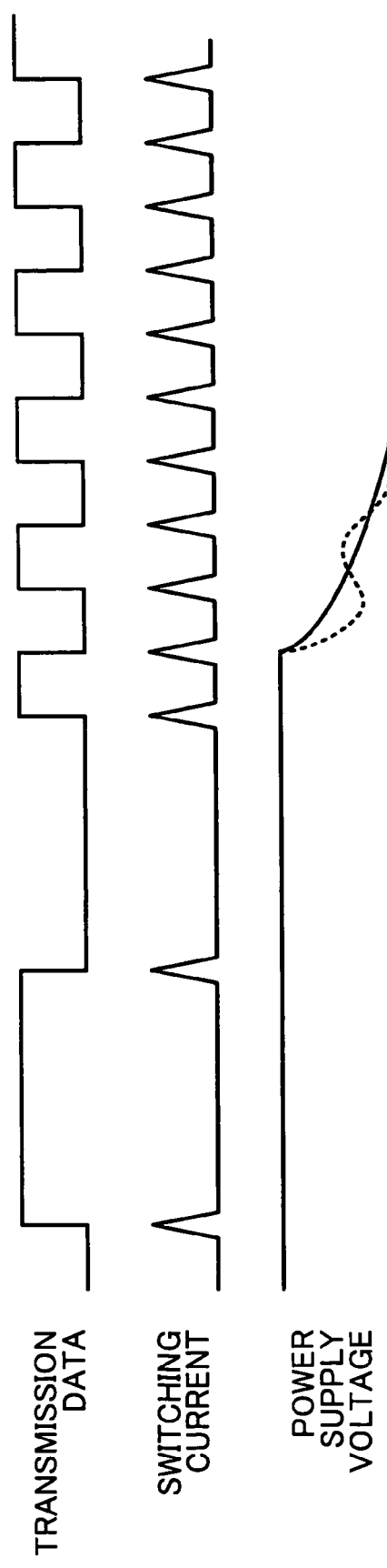
FIG. 15 is a graph showing a relationship between transmission data, switching current, and power supply voltage in a conventional differential signal output device.

Here, taking the equivalent circuit shown in FIG. 2 into consideration, when switching current is fed along with the change of input data, the current smoothed by the stabilization capacitor 25 is supplied from the power supply circuit 23. Furthermore, when the pattern of data varies and the switching current increases as shown in FIG. 15, it appears that the current supplied from the power supply circuit 23 varies stepwise.

Figure 4:
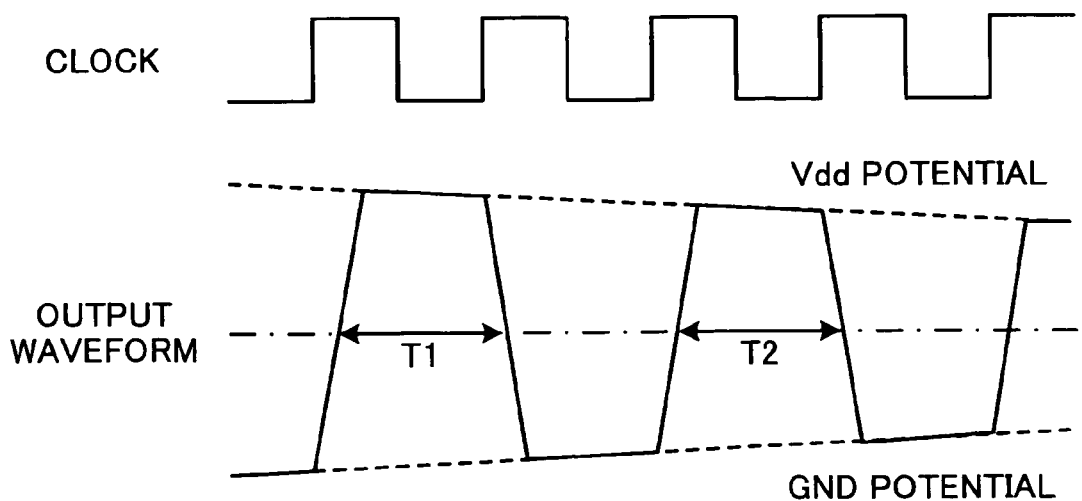
FIG. 4 is a conceptual diagram showing an output waveform when power supply voltage varies in an output buffer shown in FIG. 3.

The power supply voltage of the semiconductor integrated circuit 26 is varied in accordance with the variation in the current and the impedances 27a and 27b. Particularly, the inductance component due to the bonding wire included in the impedances 27a and 27b may cause the ringing phenomenon in the power supply voltage as shown in a dotted line in FIG. 15. As described referring to FIG. 4, the variation in a voltage difference between the power supply Vdd and the ground GND adversely affects the receiving side as jitter.

However, in the differential signal output device 1, when the switching current is fed to the first differential signal generation circuit 4 along with the change of the transmission data, the dummy data do not change. Therefore, the switching current is not fed to the second differential signal generation circuit 5.

On the other hand, when the transmission data do not change and thus the switching current is not fed to the first differential signal generation circuit 4, the dummy data change. Therefore, the switching current is fed to the second differential signal generation circuit 5.

Figure 16:
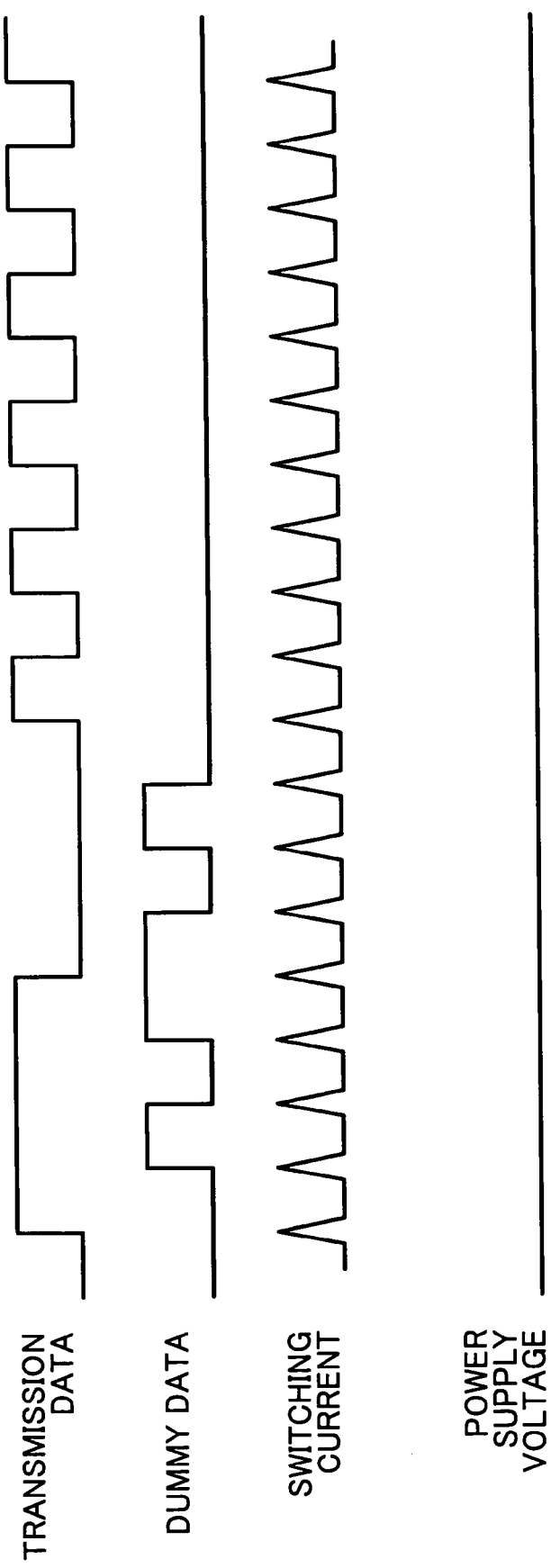
FIG. 16 is a graph showing a relationship between transmission data, switching current, and power supply voltage in the differential signal output device according to the first embodiment of the present invention.

Accordingly, as shown in FIG. 16, the constant switching current is fed at all times in the differential signal output device 1. When the switching current is smoothed, the current fed from the power supply circuit becomes constant and the power supply voltage of the differential signal output device 1 is also kept constant.

As described above, in the differential signal output device 1 of this embodiment, the switching current is fed to the second differential signal generation circuit 5 when it is not fed to the first differential signal generation circuit 4. This makes constant consumption current for changing data regardless of the biased pattern of the transmission data. Therefore, jitter in the transmission signal caused by the variation in the power supply voltage can be suppressed.

Furthermore, in the differential signal output device 1, the capacity for stabilizing the power supply is only required to suppress a variation in the power supply due to the switching current. Therefore, the size of a chip constituting the differential signal output device 1 can be reduced.

Furthermore, the differential signal output circuit 36 constituting the differential signal output device 1 can change the amplitude of the differential signal by its switching operation. Therefore, power consumption can be reduced.

Furthermore, the differential signal output circuit 36 increases a series resistance value between the power supply and the ground when suppressing the amplitudes of the output signals OUTP and OUTM. This reduces the current consumed by amount of the differential signal output device 1. As a result, power consumption can be reduced.

In this embodiment, the description is made taking as an example a case in which the on-resistance of each MOS transistor is zero and the output impedances are matched to each other with the resistor provided in series in the MOS transistor in the differential signal output circuit 36. However, the on-resistance of a MOS transistor in a circuit is not actually zero. Therefore, the differential signal output circuit 36 is configured to match the output impedances with the on-resistance of the MOS transistor to be used and the resistor provided in series in the MOS transistor.

In this case, where the output impedances can be matched to each other only with the on-resistance of the MOS transistor, the resistor provided in series in the MOS transistor may be eliminated.

Figure 17:
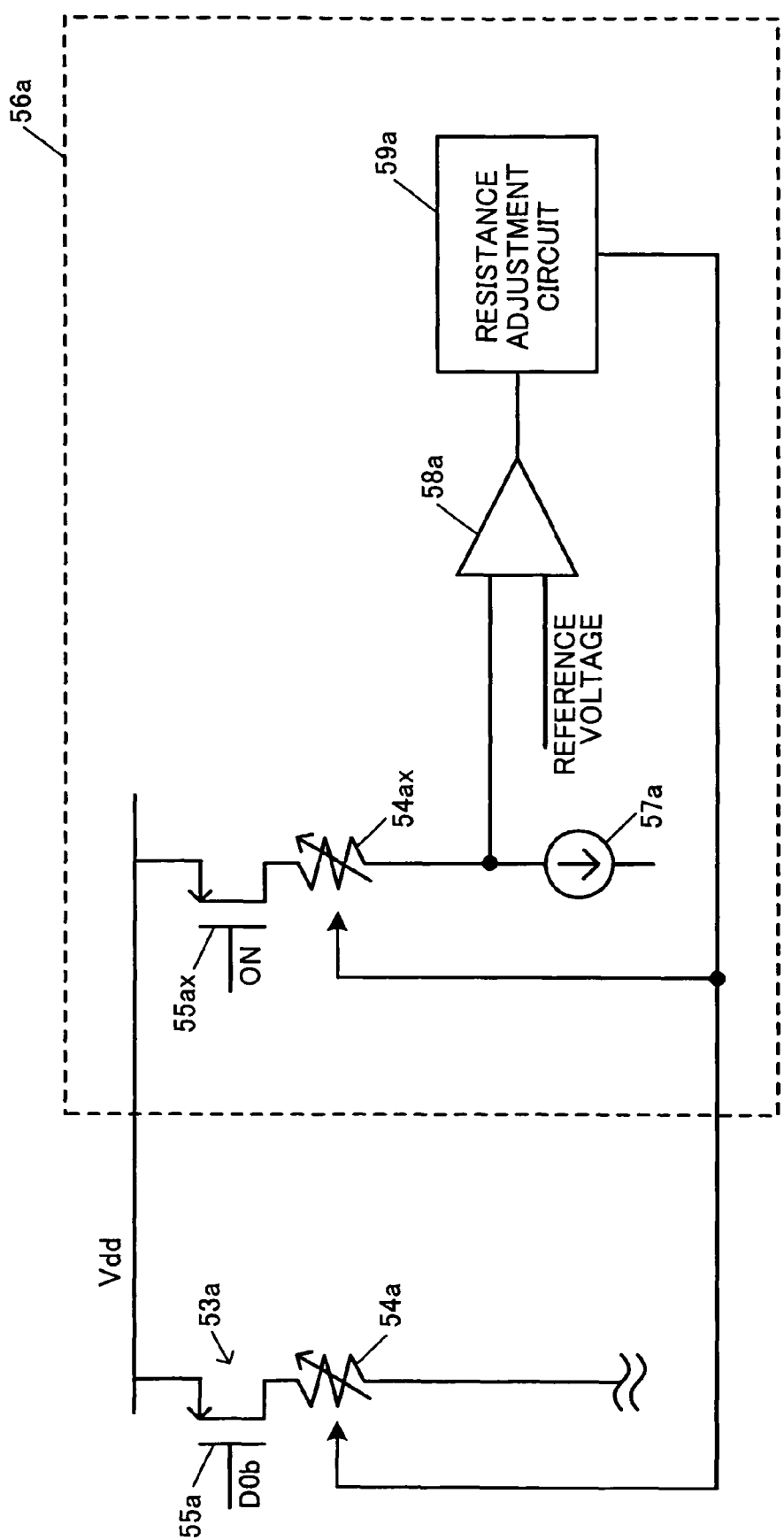
FIG. 17 is a block diagram of one part of the differential signal output circuit when an impedance adjustment circuit is provided in the differential signal output circuit shown in FIG. 11.
Figure 18:
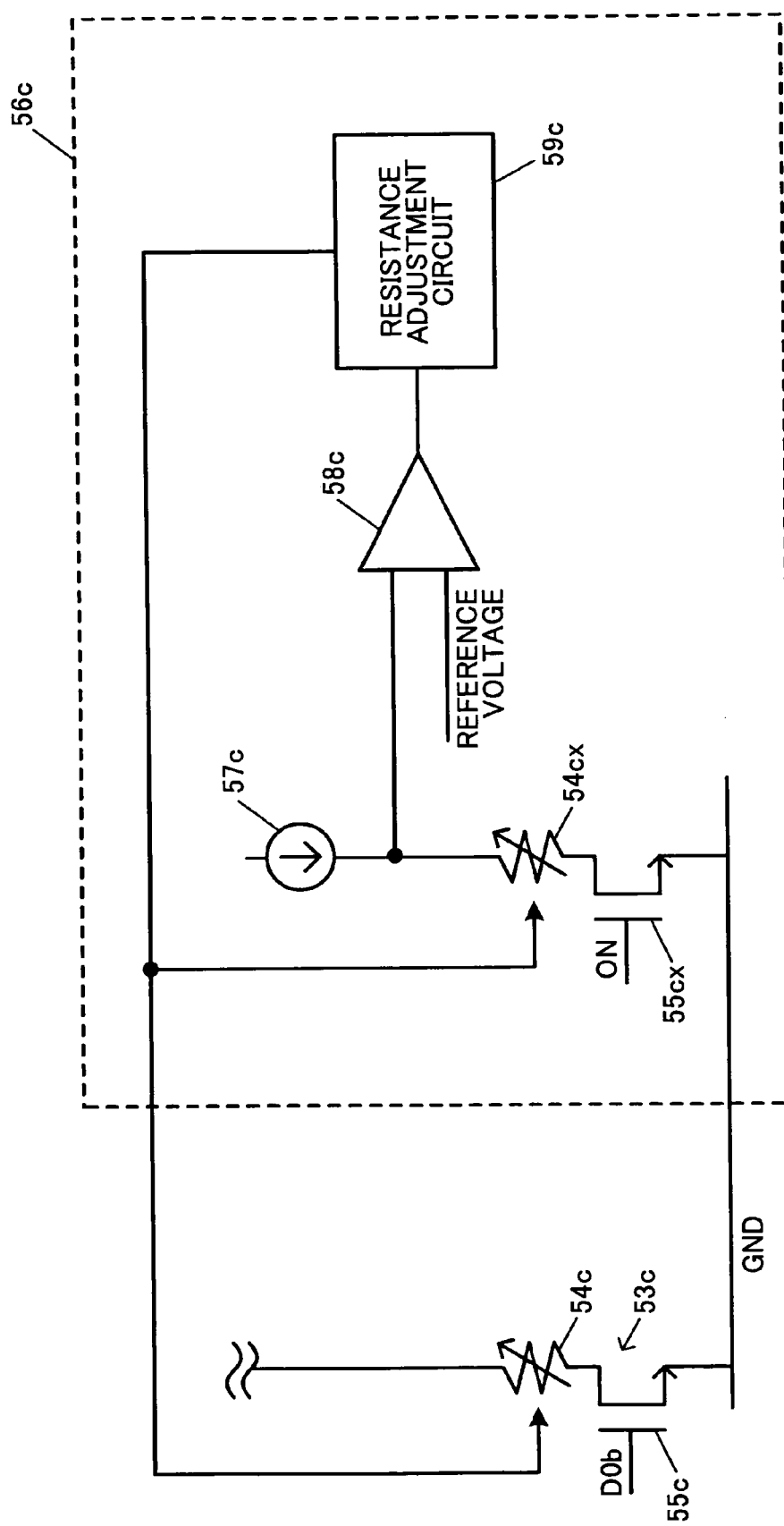
FIG. 18 is a block diagram of the other part of the differential signal output circuit shown in FIG. 17.

Furthermore, as shown in FIGS. 17 and 18, in order to deal with a case in which the on-resistance value of the MOS transistor is varied in accordance with temperature, power supply voltage, etc., causing the variation in the output impedance in the differential signal output circuit 36, an impedance adjustment circuit may be provided in which each adjustment switch adjusts the resistance value of a variable resistor provided in series in the MOS transistor to adjust the impedance of the adjustment switch.

In FIG. 17, an impedance adjustment circuit 56a provided in the adjustment switch 53a has a resistor 54ax identical to the resistor 54a, a MOS transistor 55ax identical to the MOS transistor 55a, a constant current source 57a, a comparator 58a, and a resistance adjustment circuit 59a that adjusts the resistance values of the resistors 54a and 54ax.

Each of the resistors 54a and 54ax is composed of a variable resistor in which plural resistors and a switch are combined. Note that the resistors 54a and 54ax may be composed of a MOS transistor whose gate voltage is adjusted.

The MOS transistor 55ax has a drain connected to the power supply, a source connected to one end of the resistor 54ax, and a gate to which a constant "high level" signal is input. The constant current source 57a is provided so as to feed constant current to the resistors 54ax and the MOS transistor 55ax.

The comparator 58a compares the voltage of the other end of the resistor 54ax with reference voltage. Here, the reference voltage is equal to the voltage of the other end of the resistor 54ax when the impedances of the resistor 54ax and the MOS transistor 55ax are desired impedances.

The resistance adjustment circuit 59a adjusts the resistance values of the resistors 54a and 54ax so that a comparison result by the comparator 58a shows that the voltage of the other end of the resistor 54ax is equal to the reference voltage. Note that the resistance adjustment circuit 59a adjusts the resistors 54a and 54ax so as to make their resistance values become equal to each other at all times.

The impedance adjustment circuits provided in the adjustment switches 53b, 53e, and 53f are configured in the same manner as the impedance adjustment circuit 56a. Therefore, the description of these impedance adjustment circuits is omitted.

In FIG. 18, an impedance adjustment circuit 56c provided in the adjustment switch 53c has a resistor 54cx identical to the resistor 54c, a MOS transistor 55cx identical to the MOS transistor 55c, a constant current source 57c, a comparator 58c, and a resistance adjustment circuit 59c that adjusts the resistance values of the resistors 54c and 54cx.

Each of the resistors 54c and 54cx is composed of a variable resistor in which plural resistors and a switch are combined. Note that the resistors 54c and 54cx may be composed of a MOS transistor whose gate voltage is adjusted.

The MOS transistor 55cx has a drain connected to one end of the resistor 54cx, a source connected to ground, and a gate to which a constant "high level" signal is input. The constant current source 57c is provided so as to feed constant current to the resistor 54cx and the MOS transistor 55cx.

The comparator 58c compares the voltage of the other end of the resistor 54cx with reference voltage. Here, the reference voltage is equal to the voltage of the other end of the resistor 54cx when the impedances of the resistor 54cx and the MOS transistor 55cx are desired impedances.

The resistance adjustment circuit 59c adjusts the resistance values of the resistors 54c and 54cx so that a comparison result by the comparator 58c shows that the voltage of the other end of the resistor 54cx is equal to the reference voltage. Note that the resistance adjustment circuit 59c adjusts the resistors 54c and 54cx so as to make their resistance values become equal to each other at all times.

The impedance adjustment circuits provided in the adjustment switches 53d, 53g, and 53h are configured in the same manner as the impedance adjustment circuit 56c. Therefore, the description of these impedance adjustment circuits is omitted.

Furthermore, in this embodiment, the description is made taking as an example a case in which the first and second differential signal generation circuits 4 and 5 have the preemphasis function and the amplitude of the transmission signal is switched at two levels. However, the first and second differential signal generation circuits 4 and 5 may be configured to switch the amplitude of the transmission signal at multiple levels in order to meet, for example, voltage margining in PCI Express Gen2.

For example, when the amplitude of the transmission signal is switched at multiple levels, the signal generation circuit 28 shown in FIG. 8 is configured to generate a data signal D0 representing the transmission data; an inversion signal D0b obtained by inverting the data signal D0; mode signals Dm1, Dm2, and Dm3 for selecting the amplitude of the transmission signal; a signal D1p consisting of the logical sum of the data signal D0 and the mode signal Dm1; an inversion signal D1pb obtained by inverting the signal D1p; a signal D1m consisting of the logical sum of the inversion signal D0b and the mode signal Dm1; an inversion signal D1mb obtained by inverting the signal D1m; a signal D2p consisting of the logical sum of the data signal D0 and the mode signal Dm2; an inversion signal D2pb obtained by inverting the signal D2p; a signal D2m consisting of the logical sum of the inversion signal D0b and the mode signal Dm2; an inversion signal D2mb obtained by inverting the signal D2m; a signal D3p consisting of the logical sum of the data signal D0 and the mode signal Dm3; an inversion signal D3pb obtained by inverting the signal D3p; a signal D3m consisting of the logical sum of the inversion signal D0b and the mode signal Dm3; and an inversion signal D3mb obtained by inverting the signal D3m.

Note that the signal generation circuit 28 sets the mode signals Dm1, Dm2, and Dm3 to be at "low level," "low level," and "low level," respectively, when providing the largest amplitude of the transmission signal. Furthermore, it sets the mode signals Dm1, Dm2, and Dm3 to be at "low level," "low level," and "high level," respectively, when providing the second largest amplitude of the transmission signal. Furthermore, it sets the mode signals Dm1, Dm2, and Dm3 to be at "low level," "high level," and "high level," respectively, when providing the third largest amplitude of the transmission signal. Furthermore, it sets the mode signals Dm1, Dm2, and Dm3 to be at "high level," "high level," and "high level," respectively, when providing the smallest amplitude of the transmission signal.

Furthermore, the amplification buffer 35 is configured to amplify the signals D0, D0b, Dm1, Dm2, Dm3, D1p, D1pb, D1m, D1mb, D2p, D2pb, D2m, D2mb, D3p, D3pb, D3m, and D3mb.

Figure 19:
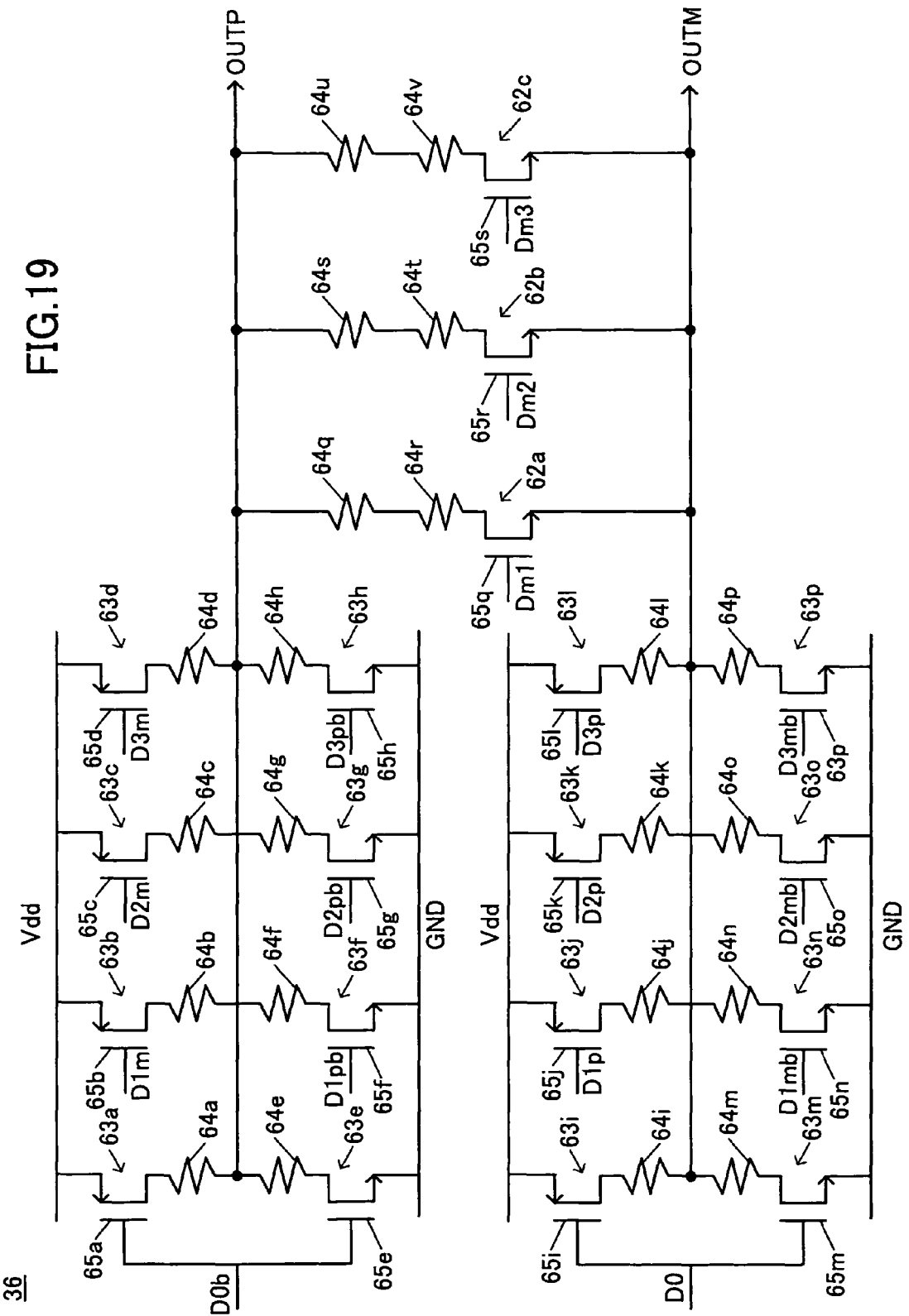
FIG. 19 is a block diagram of a differential signal output circuit modified from the differential signal output device shown in FIG. 17 so that it can switch the amplitude of a transmission signal at multiple levels.
Figure 20:
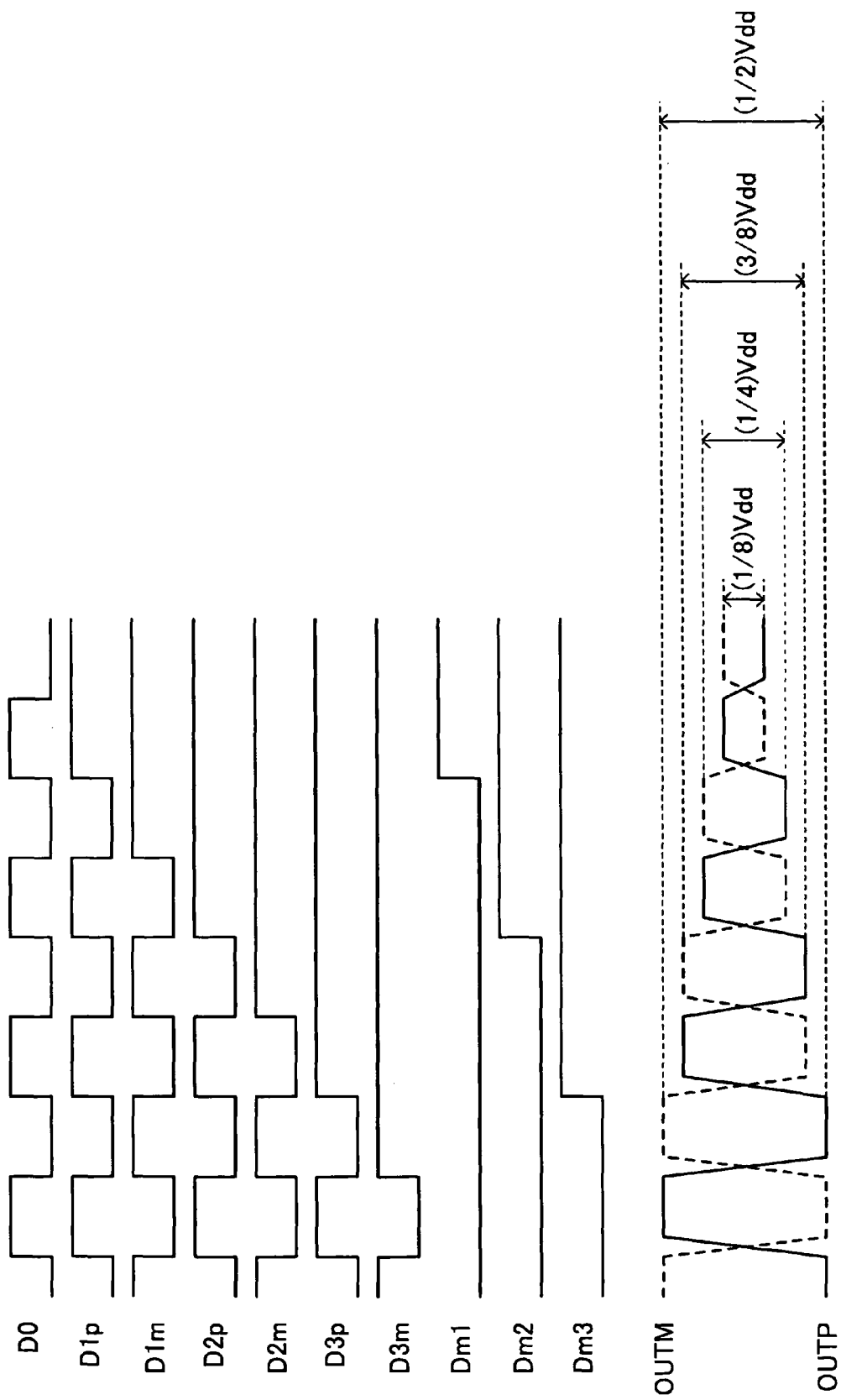
FIG. 20 is a conceptual diagram showing the amplitude of an output signal with respect to each input signal to the differential signal output circuit shown in FIG. 19.

Furthermore, as shown in FIG. 19, the differential signal output circuit 36 has a first series of adjustment switches 63a, 63b, 63c, and 63d arranged in parallel between the output terminal of the inversion output signal OUTP and the power supply; a second series of adjustment switches 63e, 63f, 63g, and 63h arranged in parallel between the output terminal of the inversion output signal OUTP and ground; a third series of adjustment switches 63i, 63j, 63k, and 63l arranged in parallel between the output terminal of the noninversion output signal OUTM and the power supply; a fourth series of adjustment switches 63m, 63n, 63o, and 63p arranged in parallel between the output terminal of the noninversion output signal OUTM and ground; and mode switches 62a, 62b, and 62c that switch a connection between the output terminal of the inversion output signal OUTP and the output terminal of the noninversion output signal OUTM.

The adjustment switch 63a has a resistor 64a having one end connected to the output terminal of the inversion output signal OUTP and a P-type MOS transistor 65a having a drain connected to the power supply, a source connected to the other end of the resistor 64a, and a gate to which the inversion signal D0b is input.

The adjustment switch 63b has a resistor 64b having one end connected to the output terminal of the inversion output signal OUTP and a P-type MOS transistor 65b having a drain connected to the power supply, a source connected to the other end of the resistor 64b, and a gate to which the signal D1m is input.

The adjustment switch 63c has a resistor 64c having one end connected to the output terminal of the inversion output signal OUTP and a P-type MOS transistor 65c having a drain connected to the power supply, a source connected to the other end of the resistor 64c, and a gate to which the signal D2m is input.

The adjustment switch 63d has a resistor 64d having one end connected to the output terminal of the inversion output signal OUTP and a P-type MOS transistor 65d having a drain connected to the power supply, a source connected to the other end of the resistor 64d, and a gate to which the signal D3m is input.

The adjustment switch 63e has a resistor 64e having one end connected to the output terminal of the inversion output signal OUTP and an N-type MOS transistor 65e having a drain connected to ground, a source connected to the other end of the resistor 64e, and a gate to which the inversion signal D0b is input.

The adjustment switch 63f has a resistor 64f having one end connected to the output terminal of the inversion output signal OUTP and an N-type MOS transistor 65f having a drain connected to ground, a source connected to the other end of the resistor 64f, and a gate to which the signal D1pb is input.

The adjustment switch 63g has a resistor 64e having one end connected to the output terminal of the inversion output signal OUTP and an N-type MOS transistor 65g having a drain connected to ground, a source connected to the other end of the resistor 64g, and a gate to which the signal D2pb is input.

The adjustment switch 63h has a resistor 64h having one end connected to the output terminal of the inversion output signal OUTP and an N-type MOS transistor 65h having a drain connected to ground, a source connected to the other end of the resistor 64h, and a gate to which the signal D3pb is input.

The adjustment switch 63i has a resistor 64i having one end connected to the output terminal of the noninversion output signal OUTM and a P-type MOS transistor 65i having a drain connected to the power supply, a source connected to the other end of the resistor 64i, and a gate to which the data signal D0 is input.

The adjustment switch 63j has a resistor 64j having one end connected to the output terminal of the noninversion output signal OUTM and a P-type MOS transistor 65j having a drain connected to the power supply, a source connected to the other end of the resistor 64j, and a gate to which the signal D1p is input.

The adjustment switch 63k has a resistor 64k having one end connected to the output terminal of the noninversion output signal OUTM and a P-type MOS transistor 65k having a drain connected to the power supply, a source connected to the other end of the resistor 64k, and a gate to which the signal D2p is input.

The adjustment switch 63l has a resistor 64l having one end connected to the output terminal of the noninversion output signal OUTM and a P-type MOS transistor 65l having a drain connected to the power supply, a source connected to the other end of the resistor 64l, and a gate to which the signal D3p is input.

The adjustment switch 63m has a resistor 64m having one end connected to the output terminal of the noninversion output signal OUTM and an N-type MOS transistor 65m having a drain connected to ground, a source connected to the other end of the resistor 64m, and a gate to which the data signal D0 is input.

The adjustment switch 63n has a resistor 64n having one end connected to the output terminal of the noninversion output signal OUTM and an N-type MOS transistor 65n having a drain connected to ground, a source connected to the other end of the resistor 64n, and a gate to which the signal D1mb is input.

The adjustment switch 63o has a resistor 64o having one end connected to the output terminal of the noninversion output signal OUTM and an N-type MOS transistor 65o having a drain connected to ground, a source connected to the other end of the resistor 64o, and a gate to which the signal D2mb is input.

The adjustment switch 63p has a resistor 64p having one end connected to the output terminal of the noninversion output signal OUTM and an N-type MOS transistor 65p having a drain connected to ground, a source connected to the other end of the resistor 64p, and a gate to which the signal D3mb is input.

The mode switch 62a has a resistor 64q having one end connected to the output terminal of the inversion output signal OUTP, a resistor 64r having one end connected to the other end of the resistor 64q, and an N-type MOS transistor 65q having a drain connected to the other end of the resistor 64r, a source connected to the output terminal of the noninversion output signal OUTM, and a gate to which the mode signal Dm1 is input.

The mode switch 62b has a resistor 64s having one end connected to the output terminal of the inversion output signal OUTP, a resistor 64t having one end connected to the other end of the resistor 64s, and an N-type MOS transistor 65r having a drain connected to the other end of the resistor 64t, a source connected to the output terminal of the noninversion output signal OUTM, and a gate to which the mode signal Dm2 is input.

The mode switch 62c has a resistor 64u having one end connected to the output terminal of the inversion output signal OUTP, a resistor 64v having one end connected to the other end of the resistor 64u, and an N-type MOS transistor 65s having a drain connected to the other end of the resistor 64v, a source connected to the output terminal of the noninversion output signal OUTM, and a gate to which the mode signal Dm3 is input.

In the following description, assume that the on-resistances of the MOS transistors 65a through 65s are zero and their off-resistances are infinity in order to facilitate the understanding of the present invention. Furthermore, assume that each resistance value of the resistors 64a through 64v is R.

With this configuration, the output impedance of the differential signal output circuit 36 becomes R/4 regardless of the statuses of the mode signals Dm1, Dm2, and Dm3. Furthermore, when the equivalent circuit including the receiving side is taken into consideration as described referring to FIG. 14, the amplitude of the transmission signal becomes (½)Vdd when the mode signals Dm1, Dm2, and Dm3 are at "low level," "low level," and "low level," respectively.

Similarly, the amplitude of the transmission signal becomes (⅜)Vdd when the mode signals Dm1, Dm2, and Dm3 are at "low level," "low level," and "high level," respectively. Furthermore, the amplitude of the transmission signal becomes (¼)Vdd when the mode signals Dm1, Dm2, and Dm3 are at "low level," "high level," and "high level," respectively. Furthermore, the amplitude of the transmission signal becomes (⅛)Vdd when the mode signals Dm1, Dm2, and Dm3 are at "high level," "high level," and "high level," respectively.

Note that in the above embodiment the description is made taking as an example a case in which the resistance values of the resistors 64a through 64v are equal to one another. However, the resistance values of the resistors 64a through 64v are determined in accordance with the amplitude of the transmission signal at each level.

(Second Embodiment)

Figure 21:
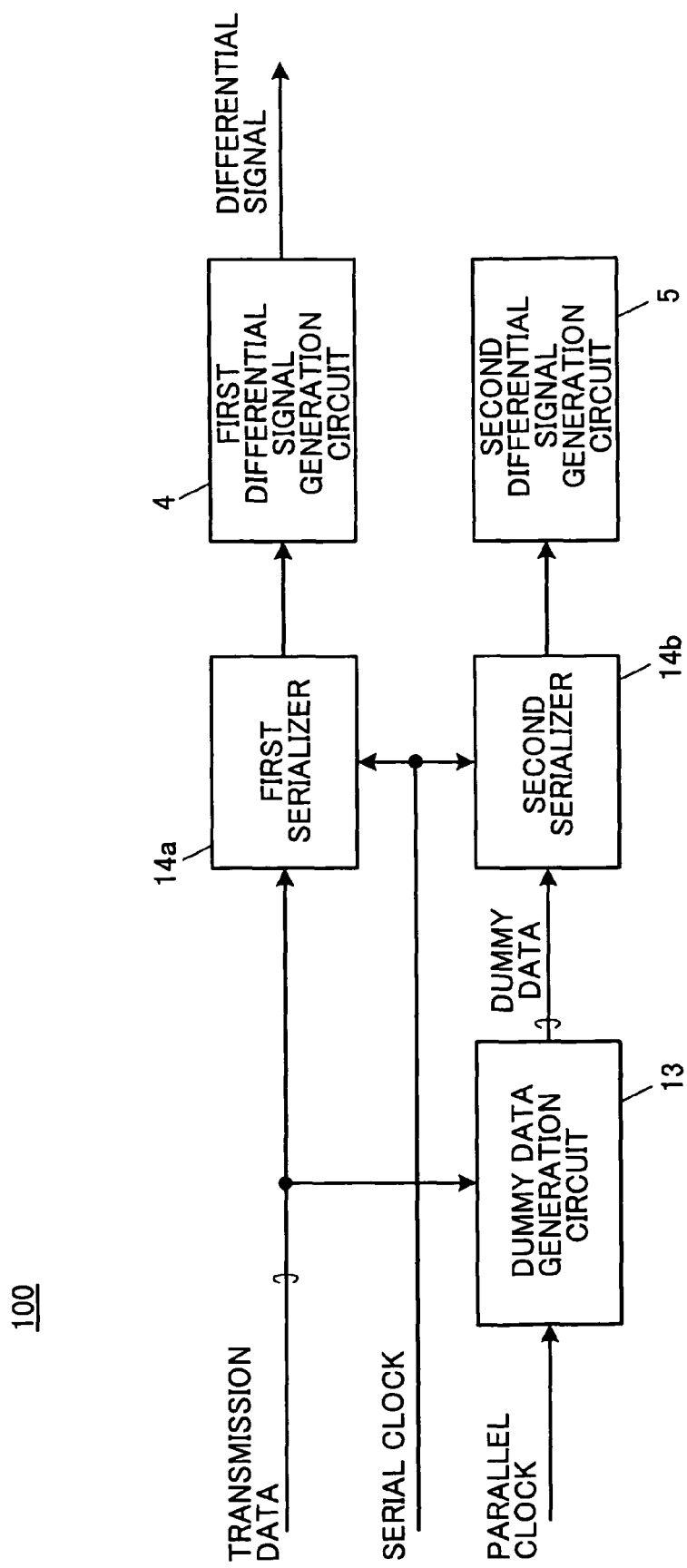
FIG. 21 is a block diagram of a differential signal output device according to a second embodiment of the present invention.

A differential signal output device according to a second embodiment of the present invention is shown in FIG. 21. Note that in this embodiment the same constituents as those of the differential signal output device 1 according to the first embodiment of the present invention are denoted by the same reference numerals and the description thereof is omitted.

As shown in FIG. 21, a differential signal output device 100 has a dummy data generation circuit 13 that generates parallel dummy data from parallel transmission data; a first serializer 14a that is synchronized with a serial clock as the reference clock of the parallel transmission data and serializes the parallel transmission data; a second serializer 14b that is synchronized with the serial clock and serializes the parallel dummy data; a first differential signal generation circuit 4 that amplifies a signal representing the transmission data and generates a differential signal from the amplified signal; and a second differential signal generation circuit 5 that amplifies a signal representing the dummy data and generates a differential signal from the amplified signal.

The dummy data generation circuit 13 generates the parallel dummy data based on the parallel transmission data input from a logic circuit, etc., of an image processing apparatus, a data link layer, or the like, and outputs the generated dummy data to the second serializer 14b in synchronization with the parallel clock.

Figure 22:
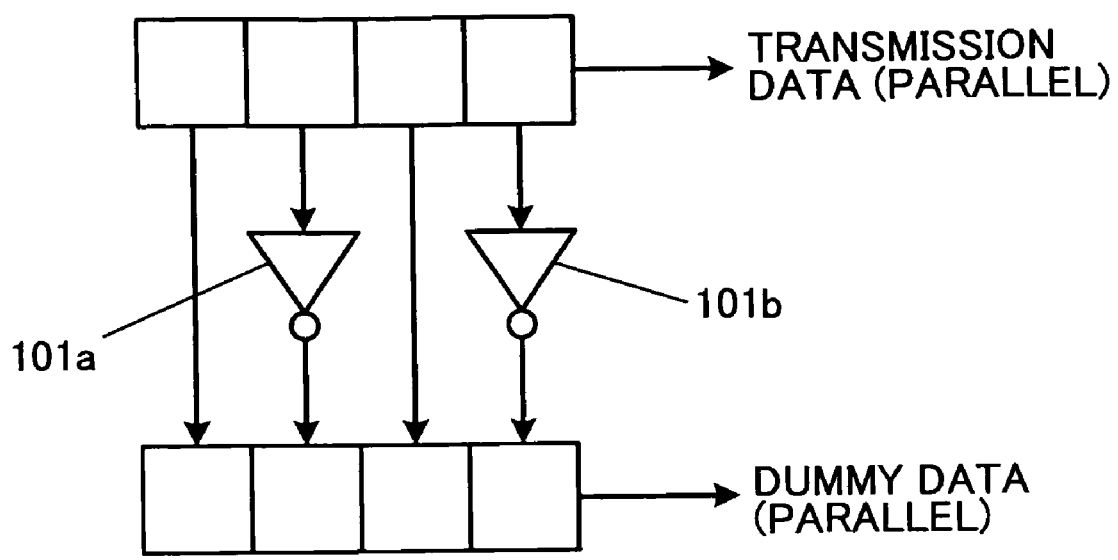
FIG. 22 is a block diagram of a dummy data generation circuit constituting the differential signal output device according to the second embodiment of the present invention.

Specifically, as shown in FIG. 22, the dummy data generation circuit 13 has inverters 101a and 101b and inverts any one of adjacent two bits of the parallel transmission data to generate the parallel dummy data.

In FIG. 21, the first serializer 14a serializes the input parallel transmission data in synchronization with the serial clock having a frequency N times the frequency of the parallel clock and outputs the serial transmission data to the first differential signal generation circuit 4. Here, N represents the number of bits of the parallel transmission data, which corresponds to four in this embodiment.

The second serializer 14b serializes the parallel dummy data in synchronization with the serial clock and outputs the serial dummy data to the second differential signal generation circuit 5.

Figure 23:
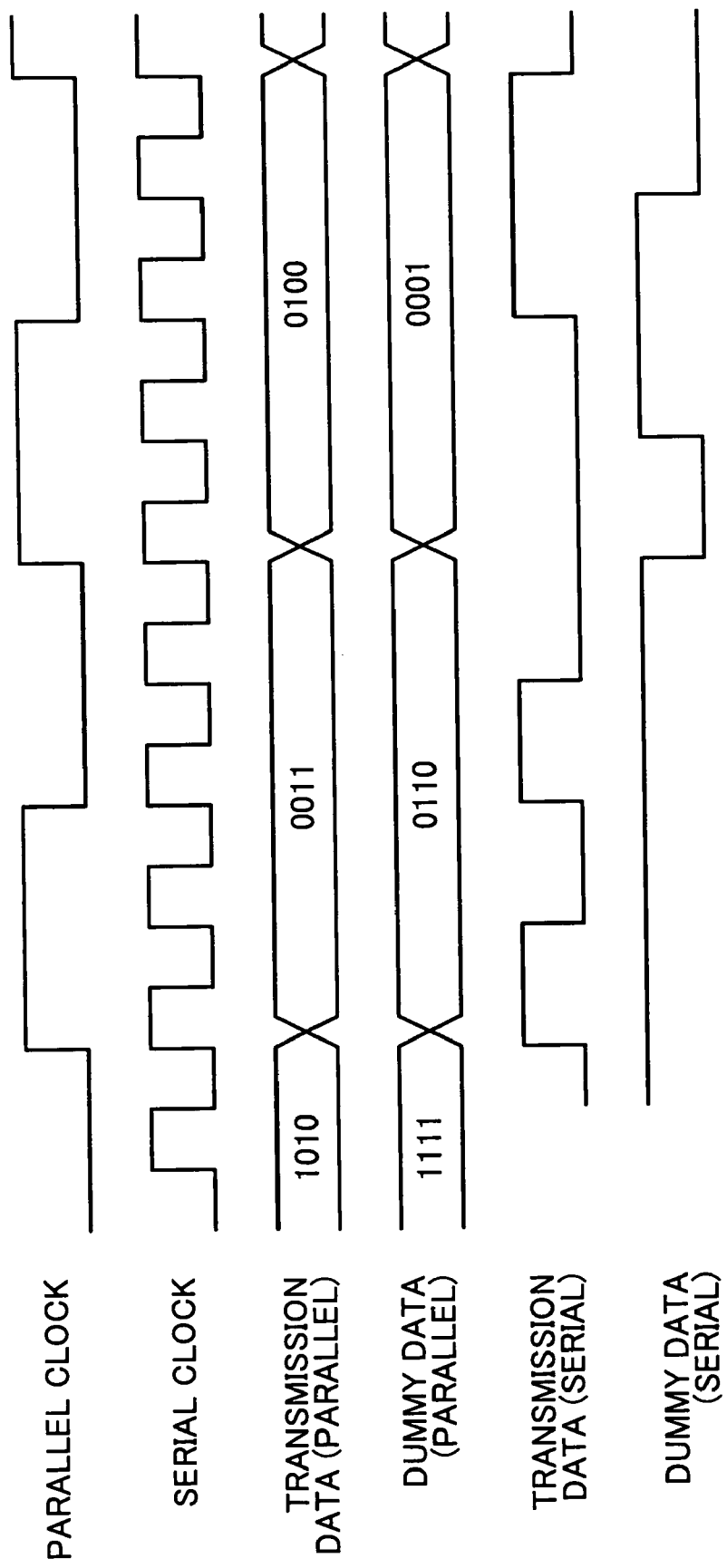
FIG. 23 is a timing chart of the differential signal output device according to the second embodiment of the present invention.

The operations of the differential signal output device 100 thus configured are now described referring to FIG. 23. FIG. 23 shows a timing chart of the differential signal output device 100.

When the parallel transmission data are "1010," the dummy data generated by the dummy data generation circuit 13 are "1111" of which the second and fourth bits of the transmission data are inverted.

Similarly, when the parallel transmission data are "0011," the dummy data generated by the dummy data generation circuit 13 are "0110" of which the second and fourth bits of the transmission data are inverted.

Furthermore, when the parallel transmission data are "0100," the dummy data generated by the dummy data generation circuit 13 are "0001" of which the second and fourth bits are inverted.

As described above, in the differential signal output device 100 of this embodiment, the parallel dummy data do not change when the transmission data change, while the parallel dummy data change when the transmission data do not change. Therefore, the same effects as those of the differential signal output device 1 according to the first embodiment of the present invention can be obtained.

Furthermore, in the differential signal output device 100 of this embodiment, the clock frequency used for generating the parallel dummy data is lower than the transfer rate of the transmission data. Therefore, an allowance can be given to the processing speed of the differential signal output device 100.

( Third Embodiment)

Figure 24:
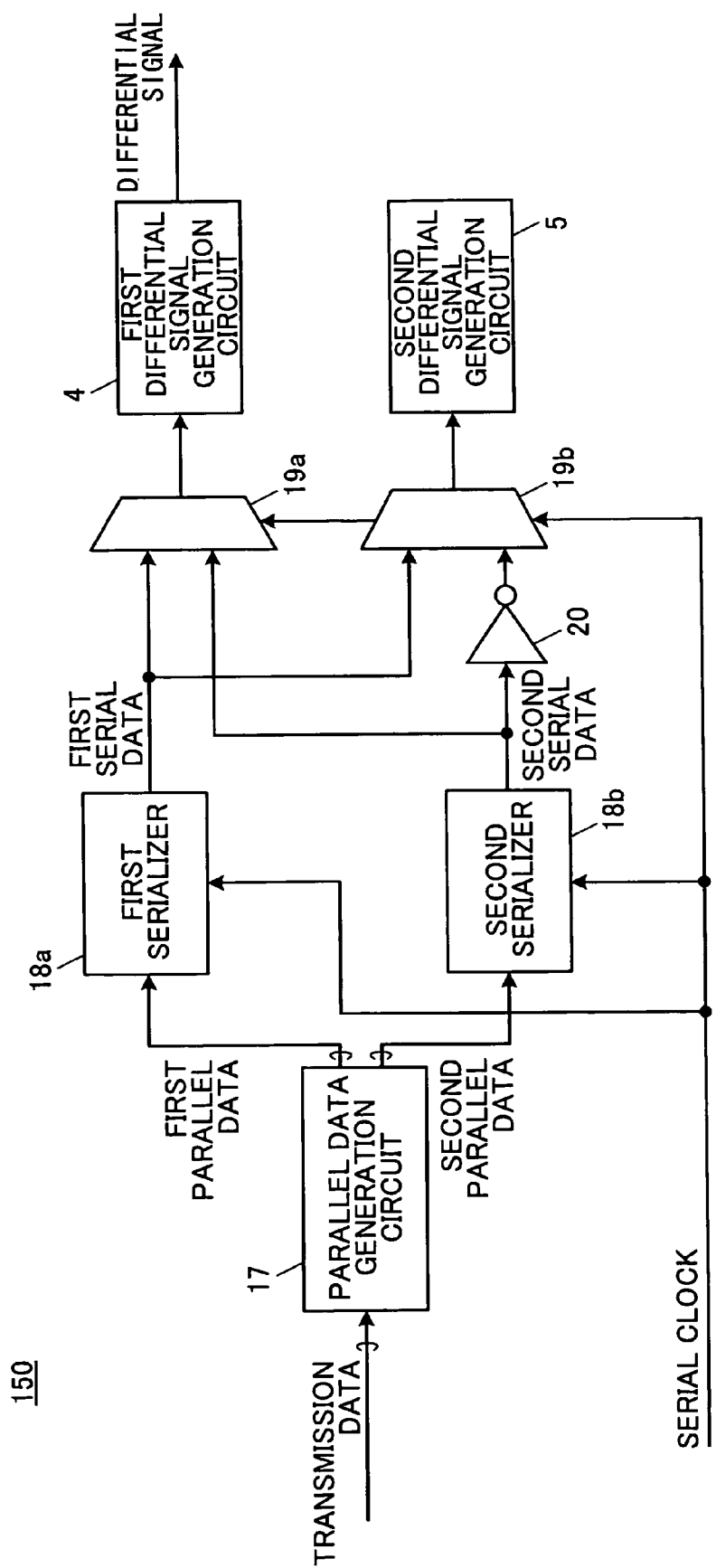
FIG. 24 is a block diagram of a differential signal output device according to a third embodiment of the present invention.

A differential signal output device according to a third embodiment of the present invention is shown in FIG. 24. Note that in this embodiment the same constituents as those of the differential signal output device 1 according to the first embodiment of the present invention are denoted by the same reference numerals and the description thereof is omitted.

As shown in FIG. 24, a differential signal output device 150 has a parallel data generation circuit 17 that generates first parallel data and second parallel data to which every one bit of parallel transmission data is allocated; a first serializer 18a that serializes the first parallel data to be first serial data; a second serializer 18b that serializes the second parallel data to be second serial data; a serial data generation circuit 19a that alternately selects every one bit of the first serial data and the second serial data to generate serial transmission data; an inverter 20 that inverts the second serial data; a dummy data generation circuit that alternately selects every one bit of the first serial data and the inversion data obtained by inverting the second serial data to generate serial dummy data; a first differential signal generation circuit 4 that amplifies a signal representing the transmission data and generates a differential signal from the amplified signal; and a second differential signal generation circuit 5 that amplifies a signal representing the dummy data and generates a differential signal from the amplified signal.

Figure 25:
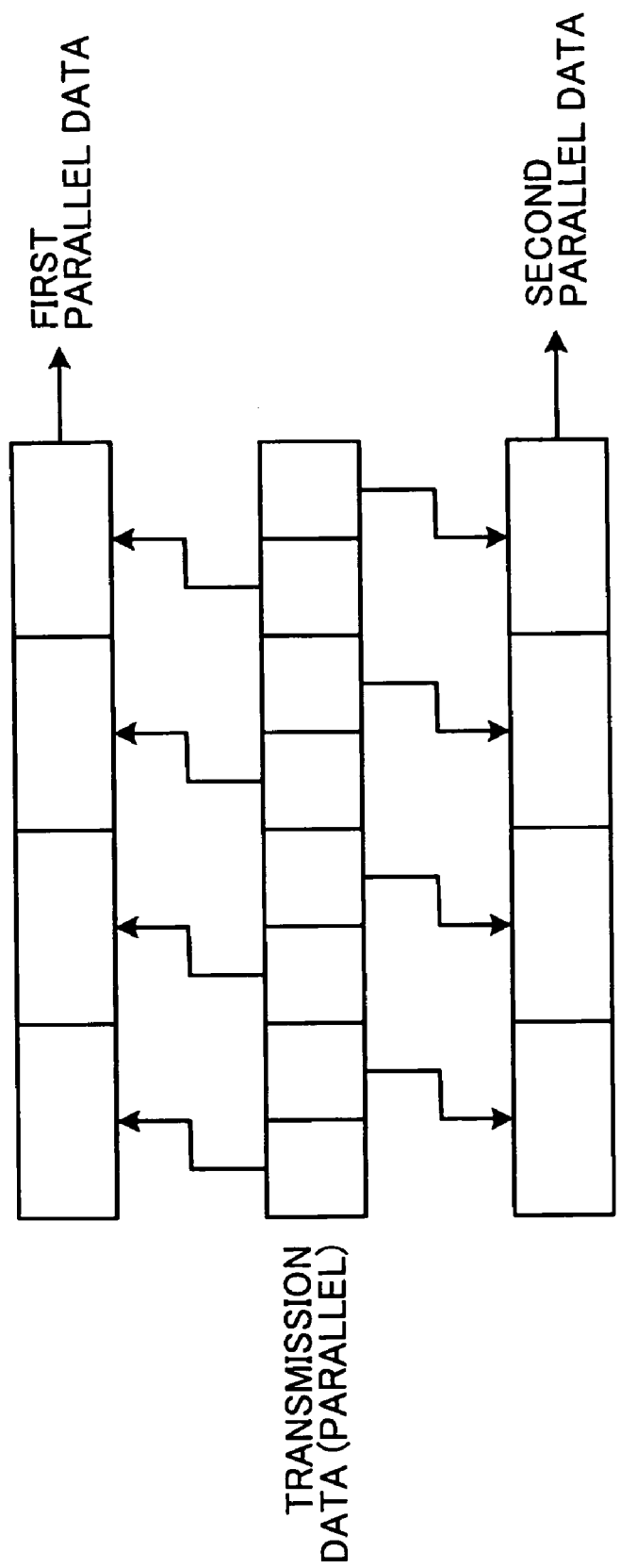
FIG. 25 is a block diagram of a parallel data generation circuit constituting the differential signal output device according to the third embodiment of the present invention.

As shown in FIG. 25, the parallel data generation circuit 17 is synchronized with a parallel clock as the reference clock of the parallel transmission data and generates the first parallel data and the second parallel data to which every one bit of the parallel transmission data input from a logic circuit, etc., of an image processing apparatus, a data link layer, or the like is alternately allocated. In other words, the first parallel data consist of odd-numbered bits of the transmission data, while the second parallel data consist of even-numbered bits thereof.

The parallel data generation circuit 17 generates and outputs the first parallel data and the second parallel data to the first serializer 18a and the second serializer 18b, respectively, in synchronization with the parallel clock.

In FIG. 24, the first serializer 18a serializes the first parallel data, is synchronized with a serial clock having a frequency N times the frequency of the parallel clock, and outputs the first serial data to the serial data generation circuit 19a and the dummy data generation circuit 19b in synchronization with the rising edge of the serial clock. Here, N is half the number of bits of the parallel transmission data, which corresponds to four in this embodiment.

Furthermore, the second serializer 18b serializes the second parallel data and outputs the second serial data to the serial data generation circuit 19a and the inverter 20 in synchronization with the falling edge of the serial clock.

The serial data generation circuit 19a is composed of a selector that alternately selects every one bit of the first serial data and the second serial data and outputs to the first differential signal generation circuit 4 the serial transmission data consisting of the bits selected by the selector.

The dummy data generation circuit 19b is composed of a selector that alternately selects every one bit of the first serial data and the inversion data obtained by inverting the second serial data and outputs to the second differential signal generation circuit 5 the serial dummy data consisting of the bits selected by the selector.

The operations of the differential signal output device 150 thus configured are now described referring to FIG. 26. FIG. 26 shows a timing chart of the differential signal output device 150.

When the parallel transmission data are "11001010," the first parallel data consisting of the odd-numbered bits of the transmission data are "1011" and the second parallel data consisting of the even-numbered bits thereof are "1000."

Similarly, when the parallel transmission data are "10011101," the first parallel data consisting of the odd-numbered bits of the transmission data are "1010" and the second parallel data consisting of the even-numbered bits thereof are "0111."

Furthermore, when the parallel transmission data are "00101100," the first parallel data consisting of the odd-numbered bits of the transmission data are "0110" and the second parallel data consisting of the even-numbered bits thereof are "0010."

In the serial data generation circuit 19a, the first parallel data are selected when the serial clock is at "high level," while the second parallel data are selected when the serial clock is at "low level." Therefore, the transmission data generated by the serial data generation circuit 19a are "11001010100111010,,,,."

On the other hand, in the dummy data generation circuit 19b, the first parallel data are selected when the serial clock is at "low level," while the inversion data obtained by inverting the second parallel data are selected when the serial clock is at "high level." Therefore, the transmission data generated by the dummy data generation circuit 19b are "10011111110010000,,,,."

As described above, in the differential signal output device 150 of this embodiment, the parallel data do not change when the transmission data change, while the parallel data change when the transmission data do not change. Therefore, the same effects as those of the differential signal output device 1 according to the first embodiment of the present invention can be obtained.

Furthermore, the differential signal output device 150 outputs the transmission data at the rising edge and the falling edge of the serial clock. Therefore, the differential signal can be output at a transmission rate two times the frequency of the serial clock.

The present invention is not limited to the specifically disclosed embodiments, and variations and modifications may be made without departing from the scope of the present invention.

The present application is based on Japanese Priority Application No. 2007-212287 filed on Aug. 16, 2007, the entire contents of which are hereby incorporated herein by reference.

What is claimed is:

1. A differential signal output device that outputs transmission data as a differential signal, the device comprising:
a first differential signal generation circuit that amplifies a signal representing the transmission data and generates the differential signal from the amplified signal;
a dummy data generation circuit that is synchronized with a reference clock of the transmission data and generates dummy data that change only in a bit where the transmission data do not change; and
a second differential signal generation circuit that amplifies a second signal representing the dummy data and generates another differential signal from the amplified second signal.

2. The differential signal output device according to claim 1, wherein
the first differential signal generation circuit has plural switches for amplifying the signal representing the transmission data and generating the differential signal, and
the second differential signal generation circuit is composed of a same circuit as the first differential signal generation circuit.

3. The differential signal output device according to claim 2, wherein
the dummy data generation circuit alternately selects one bit of the transmission data and one bit of inversion data obtained by inverting the transmission data to generate the dummy data.

4. The differential signal output device according to claim 3, wherein
the dummy data generation circuit has a T flip-flop to which the reference clock is input and alternately selects one bit of the transmission data and one bit of the inversion data obtained by inverting the transmission data based on an output signal from the T flip-flop.

5. The differential signal output device according to claim 1, wherein
the transmission data are parallel data,
the dummy data generation circuit generates parallel dummy data that change only in a bit where the parallel transmission data do not change between the bits of the parallel transmission data, and
the differential signal output device has a first serializer that serializes the parallel transmission data and a second serializer that serializes the parallel dummy data, wherein
the first and the second differential signal generation circuits respectively amplify signals representing the transmission data and the dummy data serialized by the first and the second serializers, and generate the differential signals.

6. The differential signal output device according to claim 5, wherein
the dummy data generation circuit inverts any one of adjacent two bits of the parallel transmission data to generate the parallel dummy data.

7. The differential signal output device according to claim 1, further comprising:
a parallel data generation circuit that generates first parallel data and second parallel data to which one bit of the transmission data is alternately allocated;
a first serializer that serializes the first parallel data to be first serial data;
a second serializer that serializes the second parallel data to be second serial data; and
a serial data generation circuit that is synchronized with the reference clock used for the first and the second serializers and alternately selects one bit of the first serial data and one bit of the second serial data to generate serial transmission data; wherein
the dummy data generation circuit is synchronized with the reference clock and alternately selects one bit of the first serial data and one bit of inversion data obtained by inverting the second serial data to generate the dummy data, and
the first and the second differential signal generation circuits respectively amplify signals representing the serial transmission data and the dummy data generated by the serial data generation circuit and the dummy data generation circuit, and generate the differential signals.

8. The differential signal output device according to claim 1, wherein
the first and the second differential signal generation circuits each has a first series of plural adjustment switches that switch a connection between an output terminal of an inversion signal constituting the differential signal and a power supply; a second series of plural adjustment switches that switch a connection between the output terminal of the inversion signal and ground; a third series of plural adjustment switches that switch a connection between an output terminal of a noninversion output signal constituting the differential signal and the power supply; a fourth series of plural adjustment switches that switch a connection between the output terminal of the noninversion signal and ground; and at least one mode switch that switches the connections between the output terminals; wherein the adjustment switches and the mode switch switch the connections based on at least one of a mode signal for switching an amplitude of the differential signal and the signal representing the transmission data to change the amplitude of the differential signal.

9. The differential signal output device according to claim 8, wherein, when the mode switch establishes the connections between the output terminals, the adjustment switches switch the connections so that at least one of the first series of the adjustment switches, the mode switch, and at least one of the fourth series of the adjustment switches connect the power supply and the ground in series or at least one of the third series of the adjustment switches, the mode switch, and at least one of the second series of the adjustment switches connect the power supply and the ground in series based on the signal representing the transmission data.

10. The differential signal output device according to claim 8, wherein the adjustment switches and mode switch set an impedance to prevent an output impedance of the differential signal output device from being varied regardless of a status of the mode signal.

11. The differential signal output device according to claim 8, wherein the adjustment switches and the mode switch have a MOS transistor and a resistor connected in series to the MOS transistor.

12. The differential signal output device according to claim 11, wherein the resistor is composed of a variable resistor, and the adjustment switch has an impedance adjustment circuit that adjusts a resistance value of the variable resistor to adjust an impedance of the adjustment switch.

13. A semiconductor integrated circuit comprising the differential signal output device according to claim 1.

* * * * *